(12) United States Patent
Hirukawa et al.

(10) Patent No.: US 11,262,977 B2
(45) Date of Patent: Mar. 1, 2022

(54) DISPLAY CONTROL APPARATUS, DISPLAY CONTROL METHOD, AND NON-TRANSITORY RECORDING MEDIUM

(71) Applicant: SHARP KABUSHIKI KAISHA, Sakai (JP)

(72) Inventors: Keiko Hirukawa, Sakai (JP); Satoshi Terada, Sakai (JP); Tomonobu Tomaru, Sakai (JP); Kazuki Sato, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 28 days.

(21) Appl. No.: 16/131,272

(22) Filed: Sep. 14, 2018

(65) Prior Publication Data
US 2019/0087154 A1 Mar. 21, 2019

(30) Foreign Application Priority Data
Sep. 15, 2017 (JP) .............................. JP2017-177792

(51) Int. Cl.
*G06F 3/0484* (2013.01)
*G10L 15/08* (2006.01)
*G06F 3/16* (2006.01)

(52) U.S. Cl.
CPC ............ *G06F 3/167* (2013.01); *G06F 3/0484* (2013.01); *G10L 15/08* (2013.01); *G10L 2015/088* (2013.01)

(58) Field of Classification Search
CPC .......... G06Q 10/10; G09G 5/00; G06F 3/048; G06F 3/00; G06F 3/167; G10L 15/08; G10L 2015/00; G10L 14/00
See application file for complete search history.

(56) References Cited

U.S. PATENT DOCUMENTS

| | | | | |
|---|---|---|---|---|
| 5,572,728 A * | 11/1996 | Tada | ..................... | G11B 27/031 |
| 2002/0161602 A1* | 10/2002 | Dougherty | ........... | G06Q 10/103 705/80 |
| 2003/0182286 A1* | 9/2003 | Seccuro | .................. | G06F 16/95 |
| 2004/0095371 A1* | 5/2004 | Haynes | ................. | G06F 3/0481 715/711 |
| 2006/0095857 A1* | 5/2006 | Torvinen | ................ | G06Q 10/10 715/764 |
| 2007/0094611 A1* | 4/2007 | Sasaki | ..................... | G11B 27/34 715/804 |
| 2009/0019369 A1* | 1/2009 | Borovsky | ............. | G06F 3/0482 715/736 |
| 2009/0204399 A1* | 8/2009 | Akamine | ............ | G10L 15/1822 704/235 |

(Continued)

FOREIGN PATENT DOCUMENTS

JP 2013-222347 A 10/2013

*Primary Examiner* — Jennifer N Welch
*Assistant Examiner* — Qi Wan
(74) *Attorney, Agent, or Firm* — ScienBiziP, P.C.

(57) ABSTRACT

A display control apparatus includes a message storage section configured to store input messages, an attribute information applying section configured to apply attribute information to the messages, and a display control section configured to control displaying of a first display screen having a first display region for displaying the messages in chronological order and a second display region for displaying a message extracted from the messages based on the attribute information.

10 Claims, 24 Drawing Sheets

(56) References Cited

U.S. PATENT DOCUMENTS

| | | | | |
|---|---|---|---|---|
| 2010/0302382 | A1* | 12/2010 | Oikawa | G06F 3/1204 |
| | | | | 348/207.2 |
| 2010/0333014 | A1* | 12/2010 | Fritzley | G06F 3/0482 |
| | | | | 715/784 |
| 2012/0166921 | A1* | 6/2012 | Alexandrov | H04L 65/4015 |
| | | | | 715/202 |
| 2013/0325925 | A1* | 12/2013 | Mizuki | H04L 67/42 |
| | | | | 709/203 |
| 2014/0043366 | A1* | 2/2014 | Tsukuda | G09G 5/377 |
| | | | | 345/634 |
| 2014/0258416 | A1* | 9/2014 | Kurupacheril | H04L 65/4023 |
| | | | | 709/205 |
| 2015/0112749 | A1* | 4/2015 | Erdal | G06F 3/04842 |
| | | | | 705/7.19 |
| 2015/0120840 | A1* | 4/2015 | Rostocil, Jr | H04L 51/04 |
| | | | | 709/206 |
| 2016/0124593 | A1* | 5/2016 | Joi | G06Q 10/06312 |
| | | | | 715/753 |
| 2016/0283586 | A1* | 9/2016 | Thapliyal | G06Q 10/10 |
| 2017/0277672 | A1* | 9/2017 | Cho | G06F 3/04845 |
| 2018/0012194 | A1* | 1/2018 | Aoki | G06Q 10/1095 |

* cited by examiner

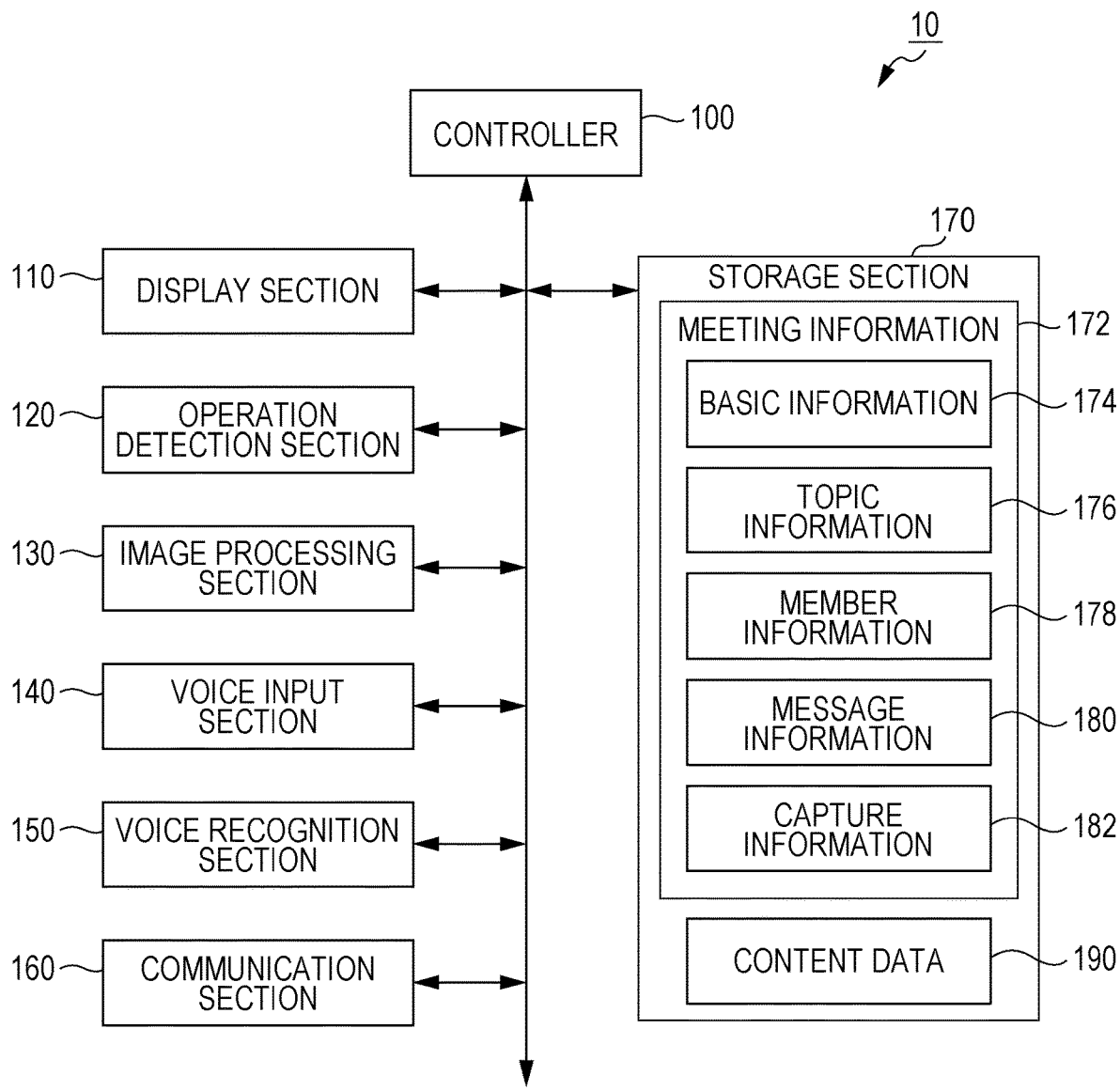

FIG. 3A

| MEETING TITLE | ATTENDEE | MATERIAL DATA | DATE AND TIME |
|---|---|---|---|
| NEW PRODUCT DEVELOPMENT MTG | A, B, C | MTG.ppt, SHIRYO.png | 2017/09/01 13:30-14:30 |
| ⋮ | ⋮ | ⋮ | ⋮ |

FIG. 3B

| MEETING TITLE | TOPIC NAME |
|---|---|
| NEW PRODUCT DEVELOPMENT MTG | PARTS SUPPLY |
| NEW PRODUCT DEVELOPMENT MTG | TECHNOLOGY RESEARCH |
| ⋮ | ⋮ |

FIG. 3C

| MEMBER NAME | JOB TITLE | IMAGE DATA |
|---|---|---|
| A | SECTION CHIEF | shain_a.jpg |
| B | SUPERVISOR | shain_b.jpg |
| C | STAFF | shain_c.jpg |
| ⋮ | ⋮ | ⋮ |

FIG. 4

| MEETING TITLE | TOPIC NAME | MESSAGE NUMBER | SPEAKER | SPEECH DATE AND TIME | MESSAGE | ATTRIBUTE INFORMATION |
|---|---|---|---|---|---|---|
| NEW PRODUCT DEVELOPMENT MTG | PARTS SUPPLY | 1 | A | 2017/09/01 13:42:20 | HOW WAS THE MEETING? | NONE |
| NEW PRODUCT DEVELOPMENT MTG | PARTS SUPPLY | 2 | B | 2017/09/01 13:42:27 | GENERALLY GOOD | NONE |
| NEW PRODUCT DEVELOPMENT MTG | PARTS SUPPLY | 3 | C | 2017/09/01 13:42:34 | CLIENT ABC ASKED IF THE SIZE COULD BE REDUCED A BIT …. | TASK |
| … | … | … | … | … | … | … |

FIG. 5

| MEETING TITLE | TOPIC NAME | CAPTURE NUMBER | CAPTURE DATE AND TIME | CAPTURE DATA | SPECIFYING FLAG |
|---|---|---|---|---|---|
| NEW PRODUCT DEVELOPMENT MTG | PARTS SUPPLY | 1 | 2017/09/01 13:42:00 | 20170901134200.jpg | Off |
| NEW PRODUCT DEVELOPMENT MTG | PARTS SUPPLY | 2 | 2017/09/01 13:47:30 | 20170901134730.jpg | On |
| ... | ... | ... | ... | ... | ... |

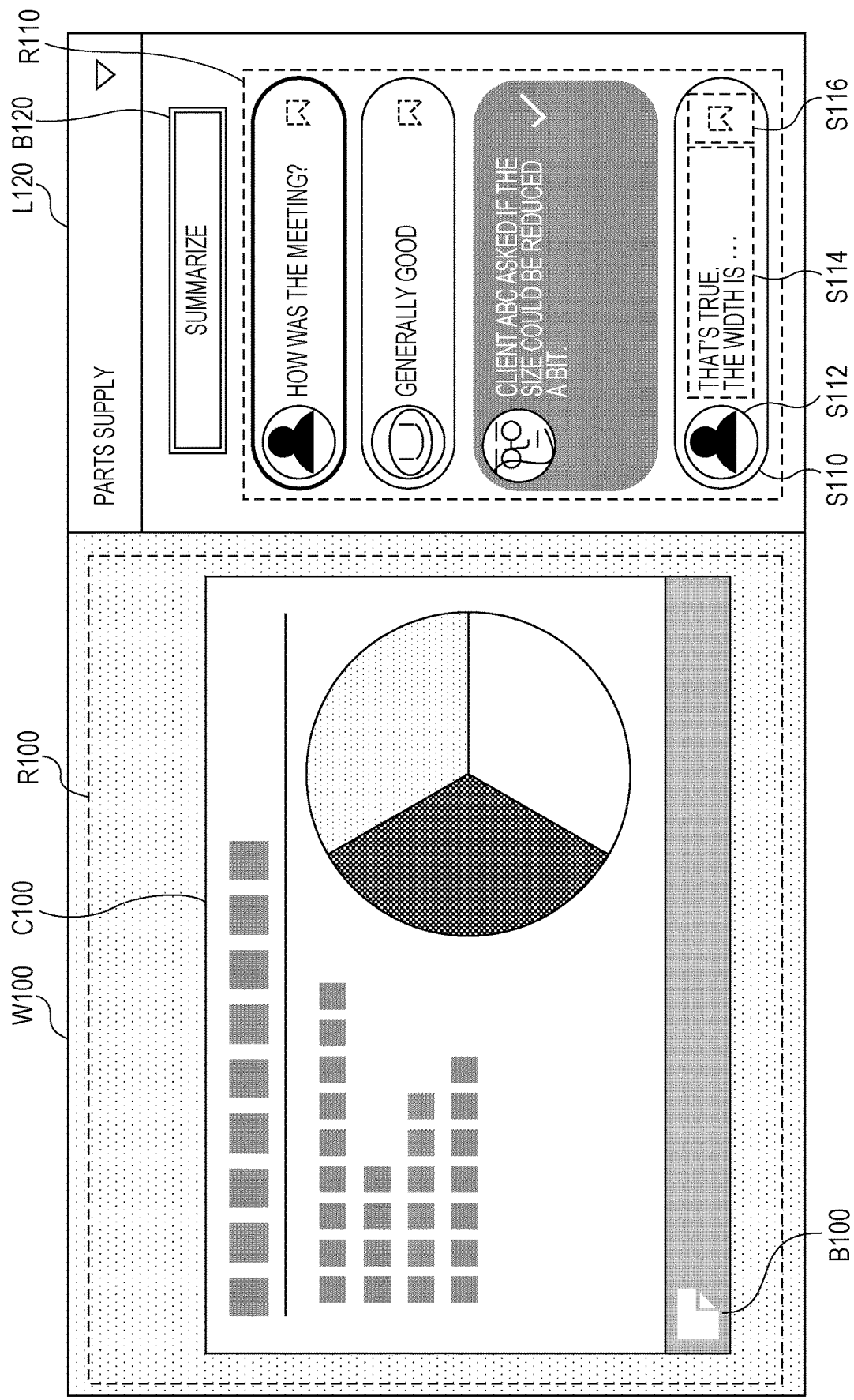

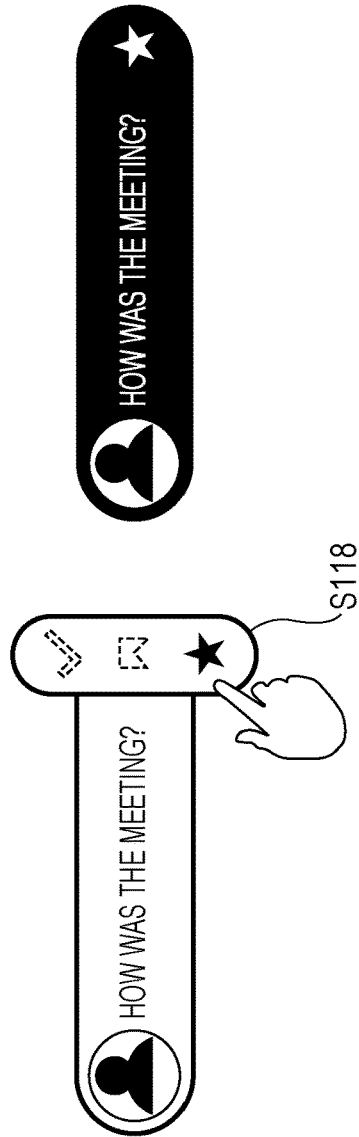
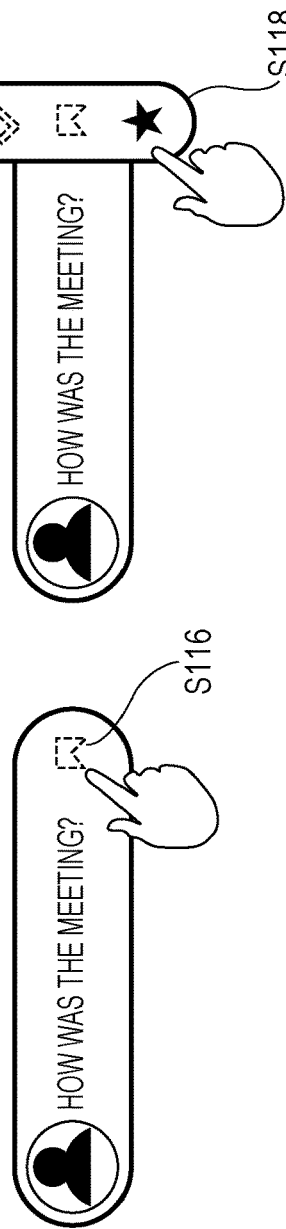
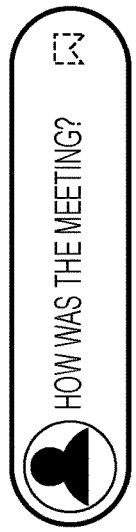
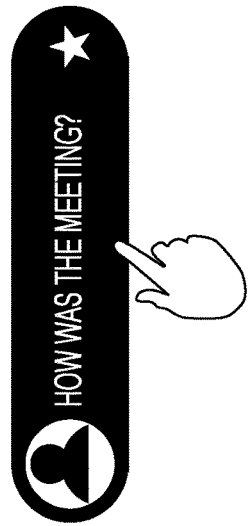
FIG. 12B  FIG. 12C  FIG. 12D
FIG. 12E  FIG. 12F

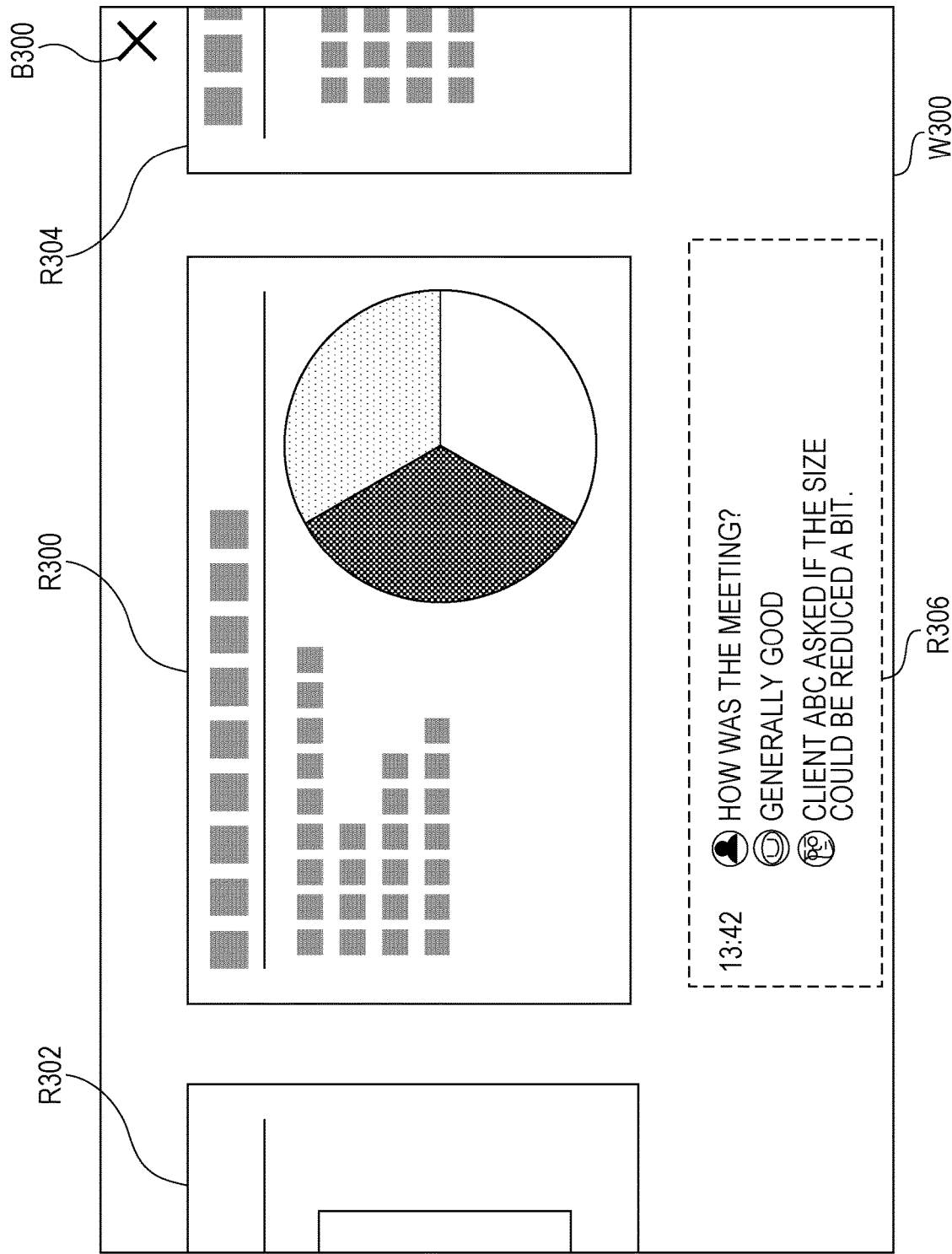

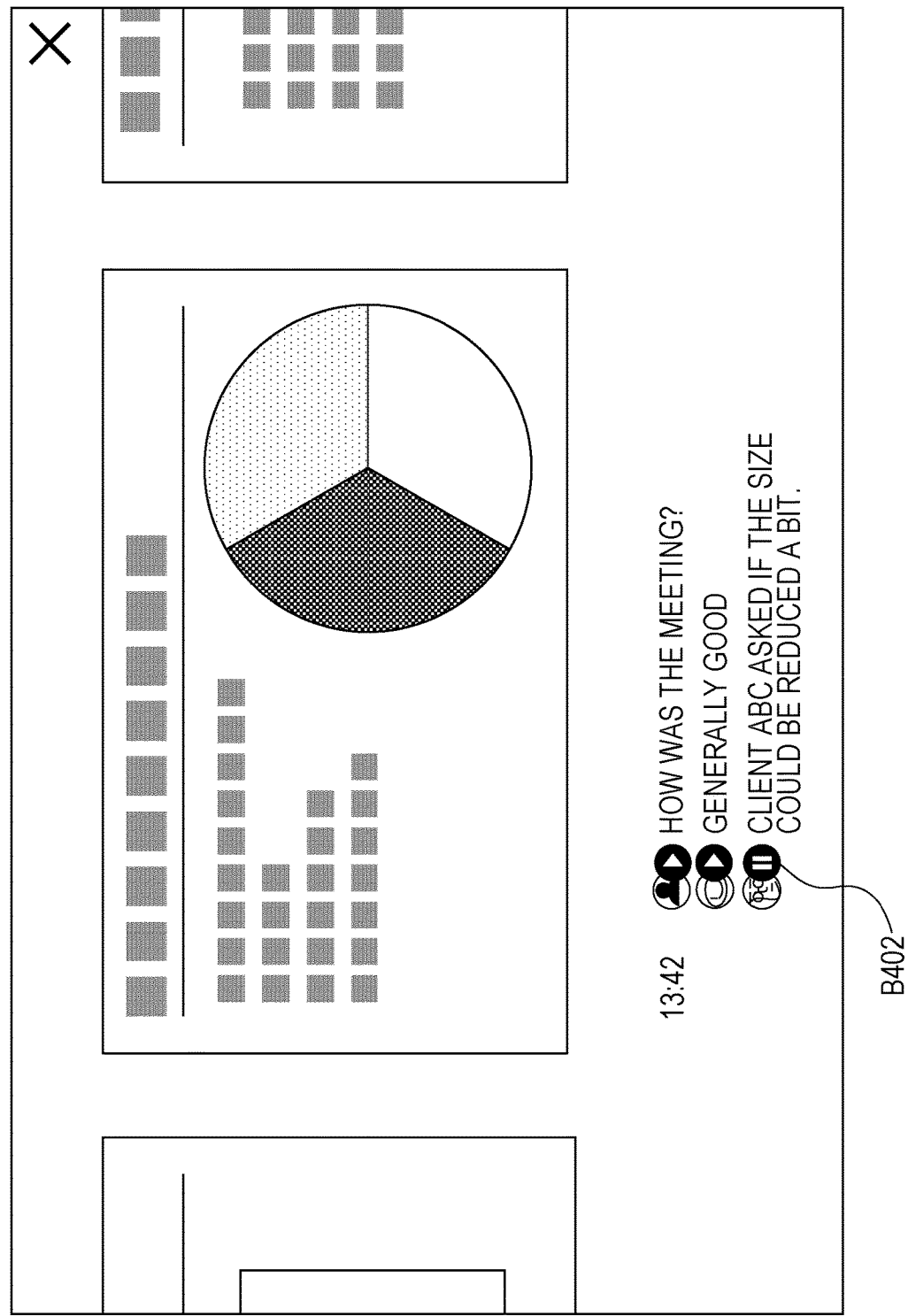

DISPLAY CONTROL APPARATUS, DISPLAY CONTROL METHOD, AND NON-TRANSITORY RECORDING MEDIUM

BACKGROUND

1. Field

The present disclosure relates to a display control apparatus and the like.

2. Description of the Related Art

Apparatuses for creating minutes of meetings and the like have been proposed. For example, Japanese Unexamined Patent Application Publication No. 2013-222347 proposes a technique for representing information about a meeting that was held in chronological order by using icons and linking the icons to discussion contents and reference materials to enable users to quickly check the state of the meeting and reference materials and to readily access desired information.

In the technique discussed in Japanese Unexamined Patent Application Publication No. 2013-222347, in order to check the contents actually spoken during a meeting, users have to click an icon to replay the voice to be replayed. Furthermore, text-based minutes are not displayed and an additional operation is to be made to refer to the minutes. In such a case, in order to compare the state of the whole meeting with the summary, various operations have to be made, and consequently, it is not so convenient.

SUMMARY

It is desirable to provide a display control apparatus and the like that extract requested messages from input messages and displays the extracted messages so as to enable users to readily check the contents of the messages.

According to an aspect of the disclosure, there is provided a display control apparatus that includes a message storage section configured to store input messages, an attribute information applying section configured to apply attribute information to the messages, and a display control section configured to control displaying of a first display screen having a first display region for displaying the messages in chronological order and a second display region for displaying a message extracted from the messages based on the attribute information.

According to another aspect of the disclosure, there is provided a display control method that includes storing input messages, applying attribute information to the messages, and controlling displaying of a first display screen having a first display region for displaying the messages in chronological order and a second display region for extracting and displaying a message to which the attribute information has been applied from the messages.

According to still another aspect of the disclosure, there is provided a non-transitory recording medium storing a program for causing a computer to execute storing input messages, applying attribute information to the messages, and controlling displaying of a first display screen having a first display region for displaying the messages in chronological order and a second display region for extracting and displaying a message to which the attribute information has been applied from the messages.

BRIEF DESCRIPTION OF THE DRAWINGS

FIG. 2 illustrates a functional configuration of a display apparatus according to the first embodiment;

FIG. 3A illustrates a data structure of basic information, FIG. 3B illustrates a data structure of topic information, and FIG. 3C illustrates a data structure of member information according to the first embodiment;

FIG. 4 illustrates a data structure of message information according to the first embodiment;

FIG. 5 illustrates a data structure of capture information according to the first embodiment;

FIGS. 12A to 12F illustrate an operation (meeting screens) according to the first embodiment;

FIG. 17A and FIG. 17B illustrate an operation (a summarized screen and a detailed screen) according to the first embodiment; and FIG. 18A and FIG. 18B illustrate an operation (a summarized screen and a detailed screen) according to a second embodiment.

DESCRIPTION OF THE EMBODIMENTS

Hereinafter, an embodiment of the disclosure will be described with reference to the drawings. An example meeting support system that includes a display control apparatus according to an embodiment will be described.

1. First Embodiment

1.1 Overall Structure

Figure 1:
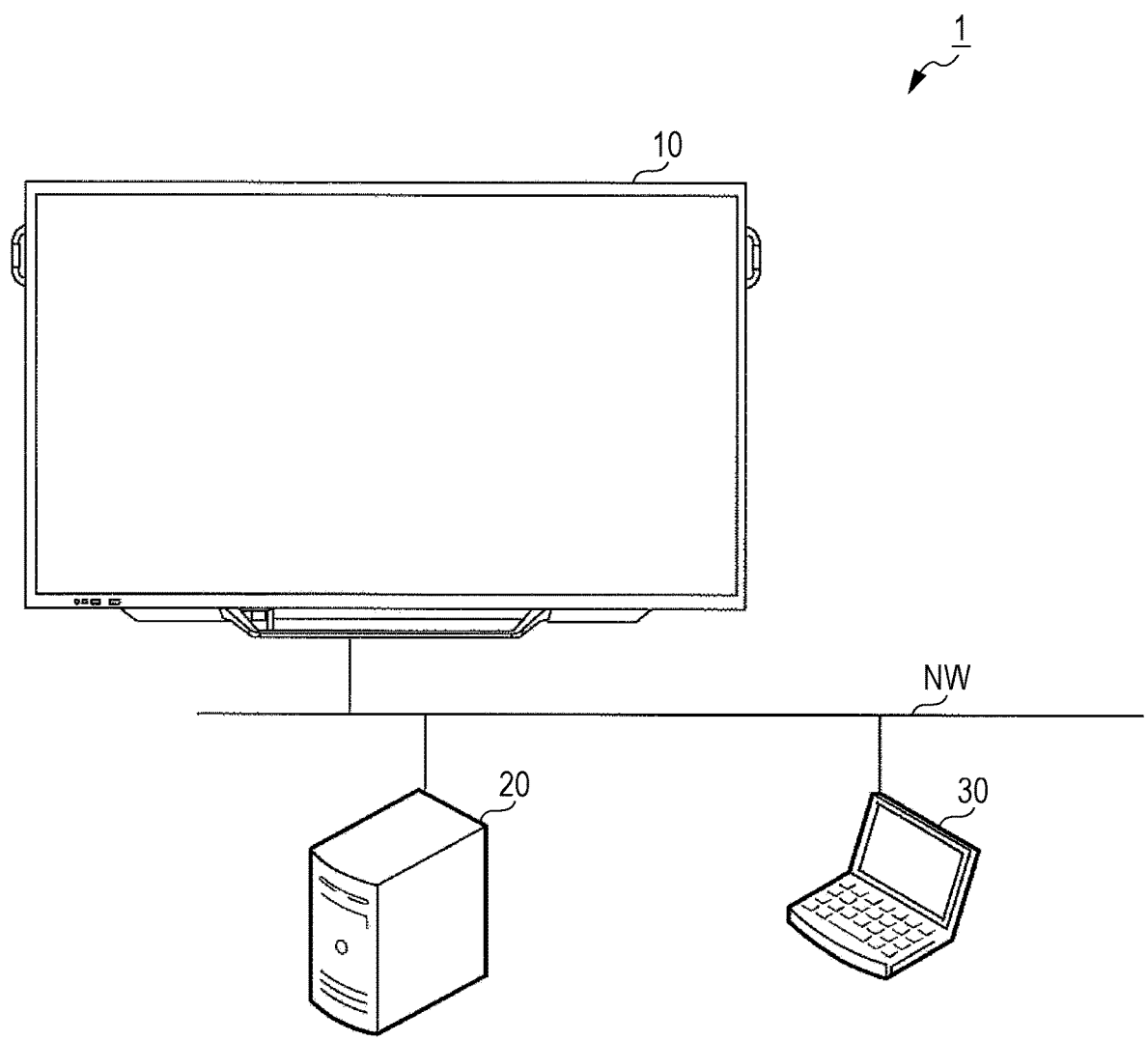
FIG. 1 schematically illustrates a meeting support system according to a first embodiment.

FIG. 1 illustrates a meeting support system 1 that includes a display apparatus 10 that includes a display control apparatus according to an embodiment, a server device 20, and a terminal device 30. In the meeting support system 1, the display apparatus 10, the server device 20, and the terminal device 30 are connected via a network NW (local area network (LAN)). A plurality of terminal devices 30 may be connected to the meeting support system 1. In this embodiment, the display apparatus 10, the server device 20, and the terminal device 30 are connected to the same network; however, the display apparatus 10, the server device 20, and the terminal device 30 may be connected via an external network. For example, the server device 20 may be deployed on the cloud.

The display apparatus 10 may be a display panel to which a display control apparatus such as a computer is connected, or an independent apparatus. The display apparatus 10 can display meeting materials and receive writing operations to the materials. The display apparatus 10 can also store information about a meeting and send the stored information to the server device 20.

The display apparatus 10 is, for example, a display apparatus such as a liquid crystal display (LCD) or an organic light emitting display (OLED), and includes a touch panel that can receive touch input. The display apparatus 10 may be a capacitive touch panel or a pressure-sensitive touch panel. In other words, the display apparatus 10 may be any apparatus that can appropriately receive a user's operational input such as a touch input. The touching operation may be performed with a user's finger or an operation pen.

As described above, the display panel and the display control apparatus may be different devices or may be an integrated display apparatus. For convenience of explanation, the display apparatus according to the embodiment has the function of the display control apparatus.

The server device 20 stores summarization information that has been received from the display apparatus 10 and sends requested summarization information in response to a summarization information transmission request from the terminal device 30. The server device 20 may be a computer or a virtual server device.

The terminal device 30 can use service provided from the server device 20. In this embodiment, the terminal device 30 is a personal computer (PC). The terminal device 30 may be any portable terminal device that can display images, and may be a small device such as a tablet or a smart phone.

1.2 Functional Configuration

A functional configuration of the display apparatus 10 will be described with reference to FIG. 2. The display apparatus 10 includes a controller 100, a display section 110, an operation detection section 120, an image processing section 130, a voice input section 140, a voice recognition section 150, a communication section 160, and a storage section 170.

The controller 100 is a functional unit for performing overall control of the display apparatus 10. The controller 100 reads and executes various programs stored in the storage section 170 to implement various functions. The controller 100 may be, for example, a central processing unit (CPU).

The display section 110 is a functional unit for displaying various kinds of information for an operator and displaying objects. In this embodiment, in addition to materials displayed in a meeting, a timeline that displays messages in chronological order is displayed. The display section 110 may be, for example, a liquid crystal display (LCD), or an organic light emitting display.

The operation detection section 120 is a functional unit for detecting an operation from an operator. For example, the operation detection section 120 may be a touch panel that is integrated with the display section 110 or hardware buttons. The operation detection section 120 may be a touch panel that employs an operation detection system such as a capacitive type touch panel, a pressure sensitive type touch panel such as resistance film type touch panel, an infrared type touch panel, or an electromagnetic induction type touch panel.

The image processing section 130 is a functional unit for performing image processing on an image displayed on the display section 110. Typical image processing includes, for example, image data sharpening processing, color adjustment processing, and image outputting processing.

The voice input section 140 is a functional unit for outputting voice that is input from a voice input device (for example, a microphone) as voice data. The voice input section 140 may include a voice input device such as a microphone in advance, or an input interface (IF) such as an external microphone, a microphone mixer or the like may be connected to the voice input section 140.

The voice recognition section 150 is a functional unit for recognizing voice data, converting the voice data into text data, and outputting the text data. The method of recognizing voice data and converting it into text data may be any known method. For example, Julius, which is an open-source large vocabulary continuous speech recognition engine, may be used. Alternatively, voice data may be sent to an external service for voice recognition via a network and the recognition result from the external service may be received.

The communication section 160 is a functional unit for the display apparatus 10 to communicate with an external device. For example, the communication section 160 may be implemented by a network interface card (NIC) that is used in a wired/wireless LAN, or a communication module that can be connected to a 3G or long term evolution (LTE) line.

The storage section 170 is a functional unit for storing various programs necessary for the operation of the display apparatus 10 and various kinds of data. The storage section 170 may be, for example, a solid-state drive (SSD), which is a semiconductor memory, or a hard disk drive (HDD).

The storage section 170 stores meeting information 172 that is information about a meeting, and content data 190. The meeting information 172 includes basic information 174, topic information 176, member information 178, message information 180, and capture information 182. The basic information 174 is stored basic information about a meeting, the topic information 176 is stored information about contents to be discussed in a meeting, the member information 178 is stored information about users, the message information 180 is stored information about messages in a meeting, and the capture information 182 is captured content data.

Specific contents of the meeting information 172 will be described with reference to the drawings. FIG. 3A illustrates a data structure of the basic information 174. The basic information 174 includes a meeting title for identifying a meeting (for example, "new product development MTG"), user names (for example, "A, B, and C"), material data indicating materials (content data) displayed in a meeting (for example, "MTG.ppt, SHIRYO.png"), and date and time indicating a scheduled start time and scheduled end time of a meeting (for example, "2017/09/01 13:30-14:30").

The material data may be, for example, data of a directly stored file of a presentation format, or content data stored as content data 190 in the storage section 170 and read from the content data 190. The data is displayed as a material. The meeting information 172 may include a file name and a file path of stored content data or may be a stored actual file. In addition to the above-mentioned attributes, attributes relating to a meeting such as a meeting location, progress, setting information of the voice recognition section 150, for example, voice recognition engine name and a language to be recognized, may be stored.

FIG. 3B illustrates a data structure of the topic information 176. The topic information 176 includes a meeting title for identifying a meeting (for example, "new product development MTG") and a topic name for identifying a topic (for example, "parts supply"). In addition to the attributes, a scheduled time to discuss the topic and keywords relating to the topic may be stored.

FIG. 3C illustrates a data structure of the member information 178. A member is an individual who attends a meeting. The member information 178 includes a member name for identifying a member (for example, "A"), a job title of a member (for example, "section chief"), and image data for identifying a member (for example, "shain_a.jpg"). In addition, information relating to an individual such as a contact address and a department may be stored.

FIG. 4 illustrates a data structure of the message information 180. The message information 180 includes a meeting title for identifying a meeting (for example, "new product development MTG"), a topic name for identifying a topic (for example, "parts supply"), a message number for identifying a message (for example, "3"), a speaker who made a speech or a speaker who is a sender of a message (for example, "C"), speech date and time (for example, "2017/09/01 13:42:34"), a message (for example, "client ABC asked if the size could be reduced a bit"), and attribute information on the message (for example, "task").

The attribute information about a message is a stored attribute applied by a user or a system. The attribute indicates a message content, the degree of importance, or the like, and may be a tag, an evaluation, a flag, or the like. For example, in this embodiment, when the tag is taken as an example, one of three tags may be applied to a message: a tag "task" that indicates a matter to be newly discussed; a tag "conclusion" that indicates a conclusion of a discussion; and a tag "important" that indicates a message to be referred to when a user review a meeting. For the sake of description, to clarify a case in which no tag is applied, when no tag is applied, "none" is indicated for the tag in the message information 180.

In addition to the above-described tags, tags such as "question", "agree", "disagree", or "emergency" may be applied or a plurality of tags may be applied to one message. The tags to be applied may be set by a user or may be preset in the display apparatus 10. Alternatively, tags that can be applied to individual meetings or topics may be selected.

The method of applying an attribute to a message may be a method other than the above-described method of applying a tag to a message. For example, a flag that indicates only whether a message is important or not, an evaluation that indicates "Nice", "Good", "Bad" or the like, or a value that indicates the degree of importance may be used.

A message number is used to identify a message. In this embodiment, a serial number starting from 1 is given to a topic. The message numbers may be serial numbers starting from 1, elapsed time from the meeting start time, attributes such as speech date and time or message, or hash values obtained from combinations of the attributes.

FIG. 5 illustrates a data structure of the capture information 182. The capture information 182 includes a meeting title for identifying a meeting (for example, "new product development MTG"), a topic name for identifying a topic (for example, "parts supply"), a capture number for identifying capture data (for example, "1"), capture date and time indicating date and time a content (material) is captured (for example, "2017/09/01 13:42:00"), capture data indicating a captured image of a content (material) (for example, 20170901134200.jpg), and a specifying flag for specifying capture data (for example, "Off"). Capture data is specified by applying a flag when a user determines that the capture data is important or a user wants to use the capture data later.

In the embodiment, the capture data is image data representing a content displayed on the display apparatus 10. The content is a content presented to users in a meeting. The content may be data (file) that is stored as material data, handwritten lines or characters, or a screen of an application. The capture data to be stored in the capture information 182 may be image data that is directly stored or a file name or a file path of a file of image data of capture data that is stored in a region in the storage section 170.

As the specifying flag, "Off" or "On" is stored, and for example, capture data whose specifying flag is "On" indicates that the capture data is important. In this embodiment, to specify capture data, the flag is used; alternatively, a tag or a value may be used.

In this embodiment, the capture numbers are serial numbers starting from 1 that are given to topics; however, the capture numbers may be serial numbers starting from 1 given to meetings, elapsed time from the meeting start time, attributes such as capture date and time and capture data, or hash values obtained from combinations of the attributes.

1.3 Processing Flow 1.3.1 Main Processing

Figure 6:
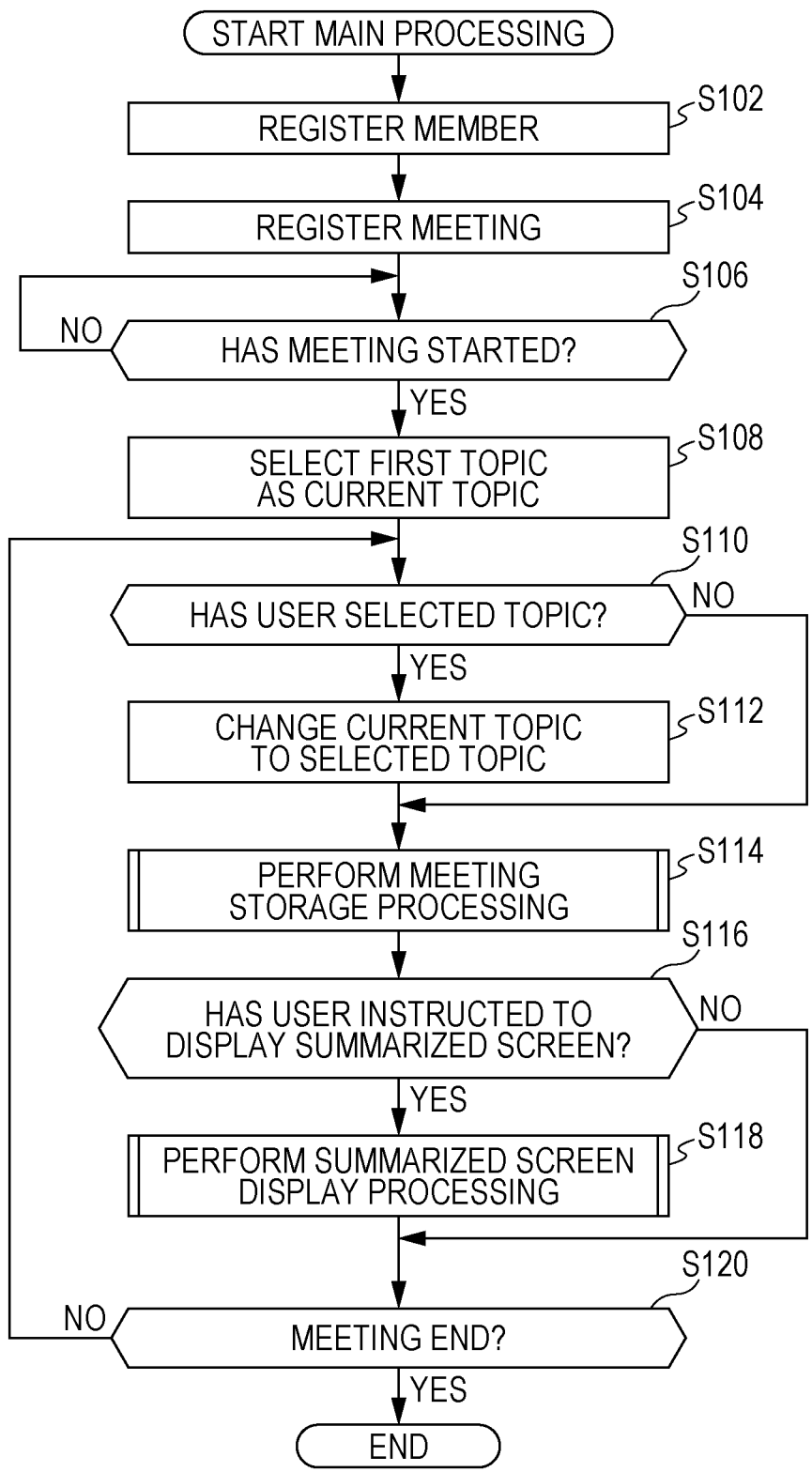
FIG. 6 illustrates an operation flow of main processing according to the first embodiment.

A flow of processing according to the embodiment will be described with reference to the drawings. The main processing according to the embodiment is described with reference to FIG. 6.

First, members in a meeting are registered (step S102). For example, a screen for registering members is displayed on the display apparatus 10 to urge a user to enter a name, job title, and image of the user. After the input, the name of the user is stored as a member name, the job title is stored as a job title, and the image is stored as image data in the member information 178.

Then, a meeting is registered (step S104). For example, a screen for registering a meeting is provided on the display apparatus 10 to urge a user to enter a meeting title, an attendee (a user who takes part in the meeting), material data, date and time, and a topic name to be discussed in the meeting. The input information is stored so as to correspond to the data structures of the basic information 174 and the topic information 176. To resume a meeting, from the meeting information that has already been registered, the meeting to be resumed may be selected.

Then, whether a meeting has started is determined (step S106). To determine the start of a meeting, whether a meeting start operation has been made by a user may be determined, or date and time of a meeting stored in the basic information 174 may be read and when the current time matches the scheduled start time of the meeting, it may be determined that the meeting has started.

After the start of the meeting, among topics of the meeting, the first topic is selected as a current topic (step S106; Yes→step S108). The selection of a topic is to specify that to which topic messages and contents relate, and the specified topic is the current topic. In this embodiment, immediately after the start of the meeting, the first topic in the topics stored in step S104 is selected as the current topic.

Then, whether the user has selected a topic is determined (step S110). If a topic is selected, the selected topic is changed as the current topic (step S110; Yes→step S112). The selection of a topic is performed, for example, by displaying a list of the topic names input in step S104 for selection and urging the user to select a topic name displayed on the list.

Then, meeting storage processing is performed (step S114). The meeting storage processing will be described below.

When an instruction for displaying a summarized screen is issued by a user's operation, summarized screen display processing is performed (step S116; Yes→step S118). The summarized screen display processing will be described below.

Then, whether the meeting has ended is determined (step S120). If the meeting has not ended, the processing returns to step S110 (step S120; No) and if the meeting has ended, the main processing ends (step S120; Yes). To determine the end of the meeting, whether a meeting end operation has been made by a user may be determined, or date and time of the meeting stored in the basic information 174 is read and when the current time matches the scheduled end time, the meeting may be ended.

1.3.2 Meeting Storage Processing

Figure 7:
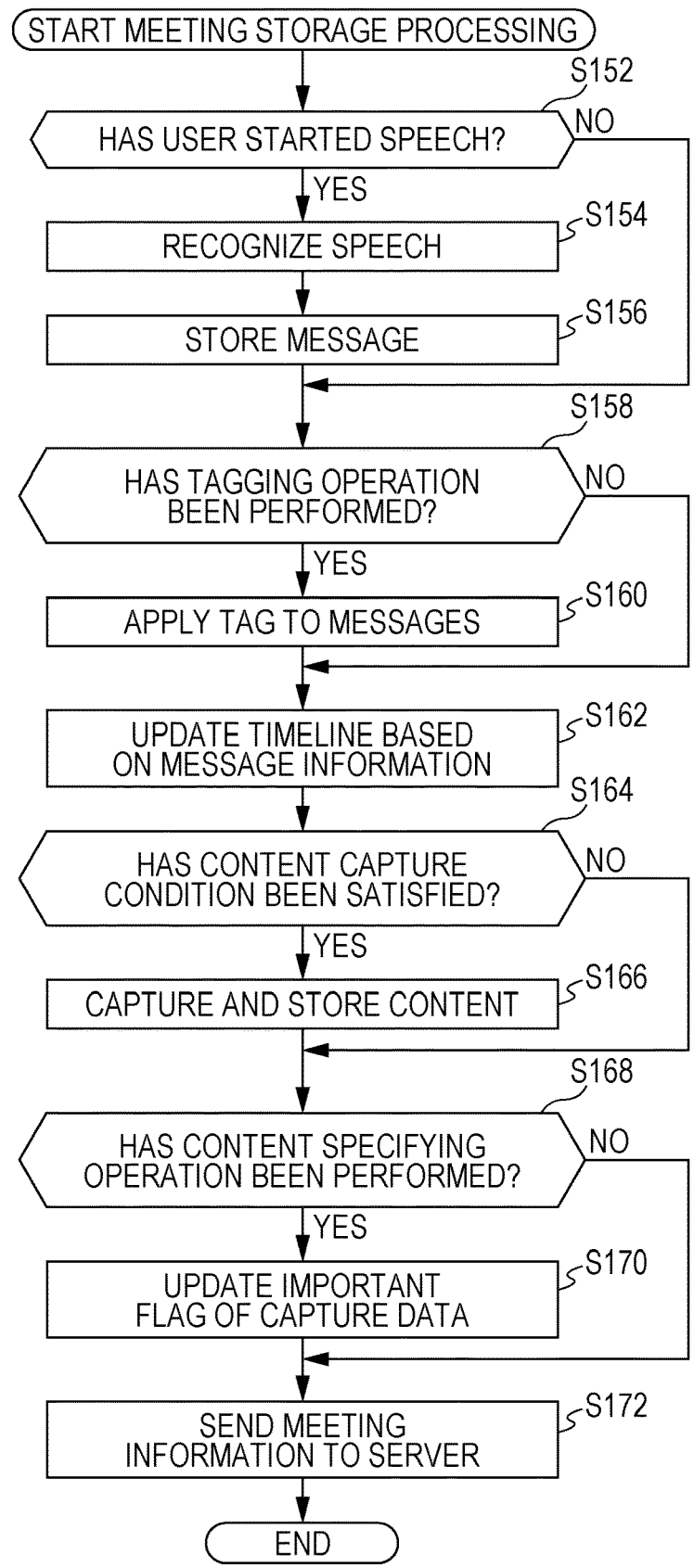
FIG. 7 illustrates an operation flow of meeting storage processing according to the first embodiment.

With reference to FIG. 7, the meeting storage processing is described. The meeting storage processing is processing for storing a message made by a user during a meeting or contents displayed on the display apparatus 10. The contents of a meeting can be stored in the display apparatus 10 by repeating the meeting storage processing from the start to the end of the meeting.

First, whether a speech has been made is determined (step S152). For example, if a state in which a voice signal input in the voice input section 140 is a predetermined volume or exceeds the predetermined volume for a predetermined time, it may be determined that a speech has been made. However, it is not determined that a speech has been made in an environmental sound or by a whisper, and also it is not determined that a speech has been made if a big sound is made but the sound continues only for a short time.

When a speech has been made, the speech is recognized and the speech is converted into text data (step S152; Yes→step S154). The text data is stored as a message together with the meeting title, the topic name, the speaker, and the message number in the message information 180 (step S156). The tag is stored as "none", that is, the message is stored without being given any attribute.

The speaker is specified, for example, in a case in which a microphone is provided for each user, by specifying an output source of a signal that has been input to the voice input section 140. When voice signals of a plurality of users are input to the voice input section 140 by using a microphone mixer or the like, the speakers may be specified by a known speaker recognition or by a user's operation.

If a user has made a tagging operation to a message that is displayed on a timeline, corresponding messages are extracted from the message information 180, the tag is applied to the messages, and the information is updated (step S158; Yes→step S160). The tagging operation will be described below.

Based on the message information 180, the timeline is updated (step S162). In other words, when a message is stored in the message information 180 or when a tag is given to an existing message, the timeline is updated.

Specifically, when a message is stored, the stored message is displayed on the timeline, and when a tagging operation is made, the message is identified. The message may be identified by changing the background color, by changing the character color, by displaying an icon that indicates the tag applied, or by combining the methods.

Then, whether a content capture condition has been satisfied or not is determined and if the content capture condition is satisfied, the content displayed on the display apparatus 10 is captured and stored in the capture information 182 (step S164; Yes→step S166). In storing the capture information 182, together with the capture data that is acquired by capturing the content, the meeting title, the topic name, the capture number, and the date and time the capturing is performed are stored.

The capture conditions may include the following conditions:
1. When a page of a content (material) is turned;
2. When a content (material) is closed;
3. When a handwritten input is made to a content;
4. When an active window is changed;
5. When a new window is opened; and
6. When an instruction for displaying a summarized screen is issued.

In addition to the above content capture conditions, necessary conditions may be added. Furthermore, a plurality of conditions may be combined. When such a condition is satisfied, the corresponding content is captured and capture data (capture image) is generated.

Then, whether a content specifying operation has been made to a content (capture data based on a content) or not is determined (step S168). If a content specifying operation has been made, the specifying flag of the capture data corresponding to the content is updated (step S170). The content specifying operation may be an operation performed by a user to select a button indicating that the content is important.

Then, the meeting information 172 is sent to the server device 20. In other words, the same content as the content stored in the storage section in the display apparatus 10 is stored in the storage section in the server device 20. With the processing, even when the display apparatus 10 is not in operation, the users of the meeting support system can check the meeting information by connecting the terminal device 30 to the server device 20.

1.3.3 Summarized Screen Display Processing

Figure 8:
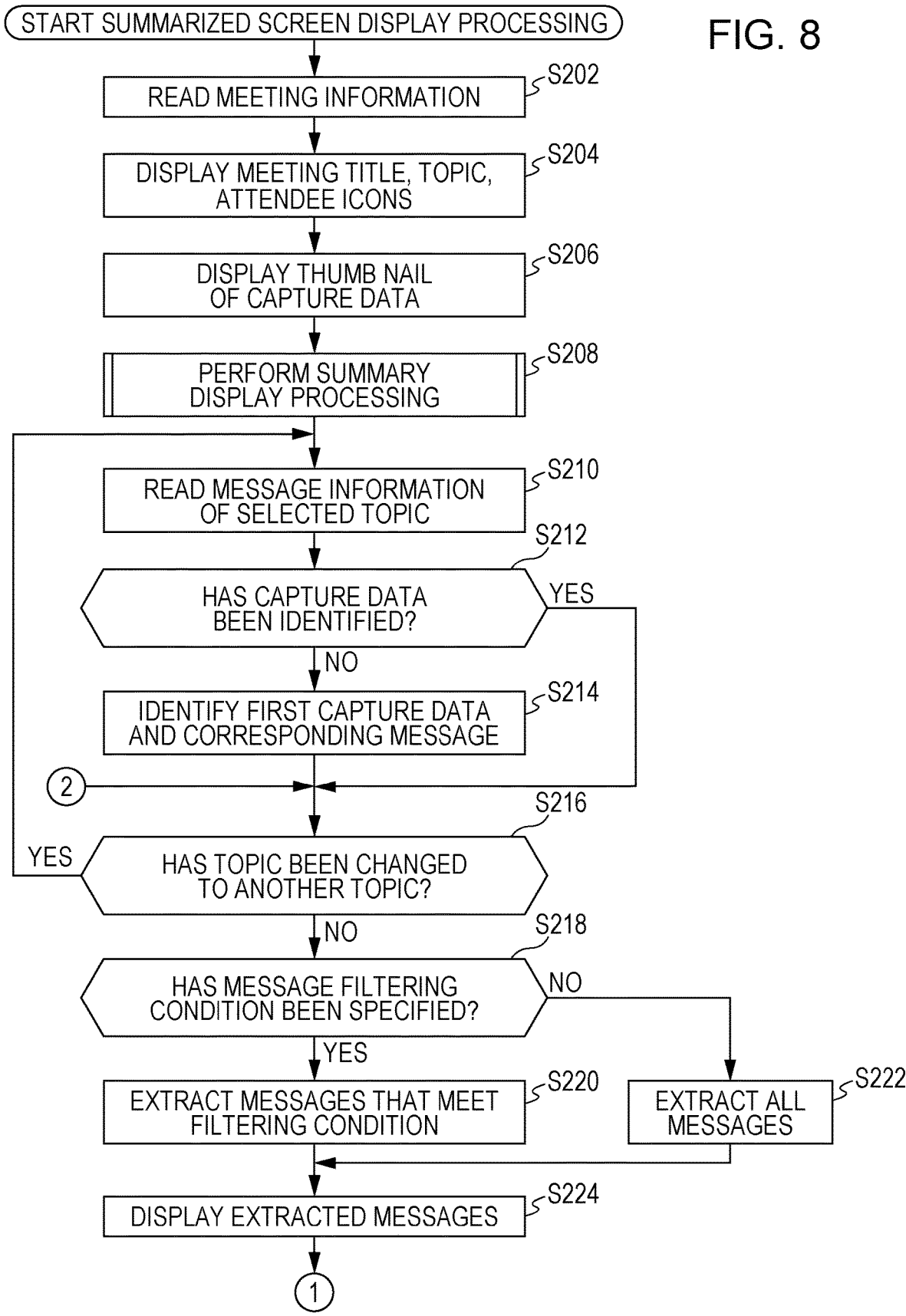
FIG. 8 illustrates an operation flow of summarized screen display processing according to the first embodiment.
Figure 9:
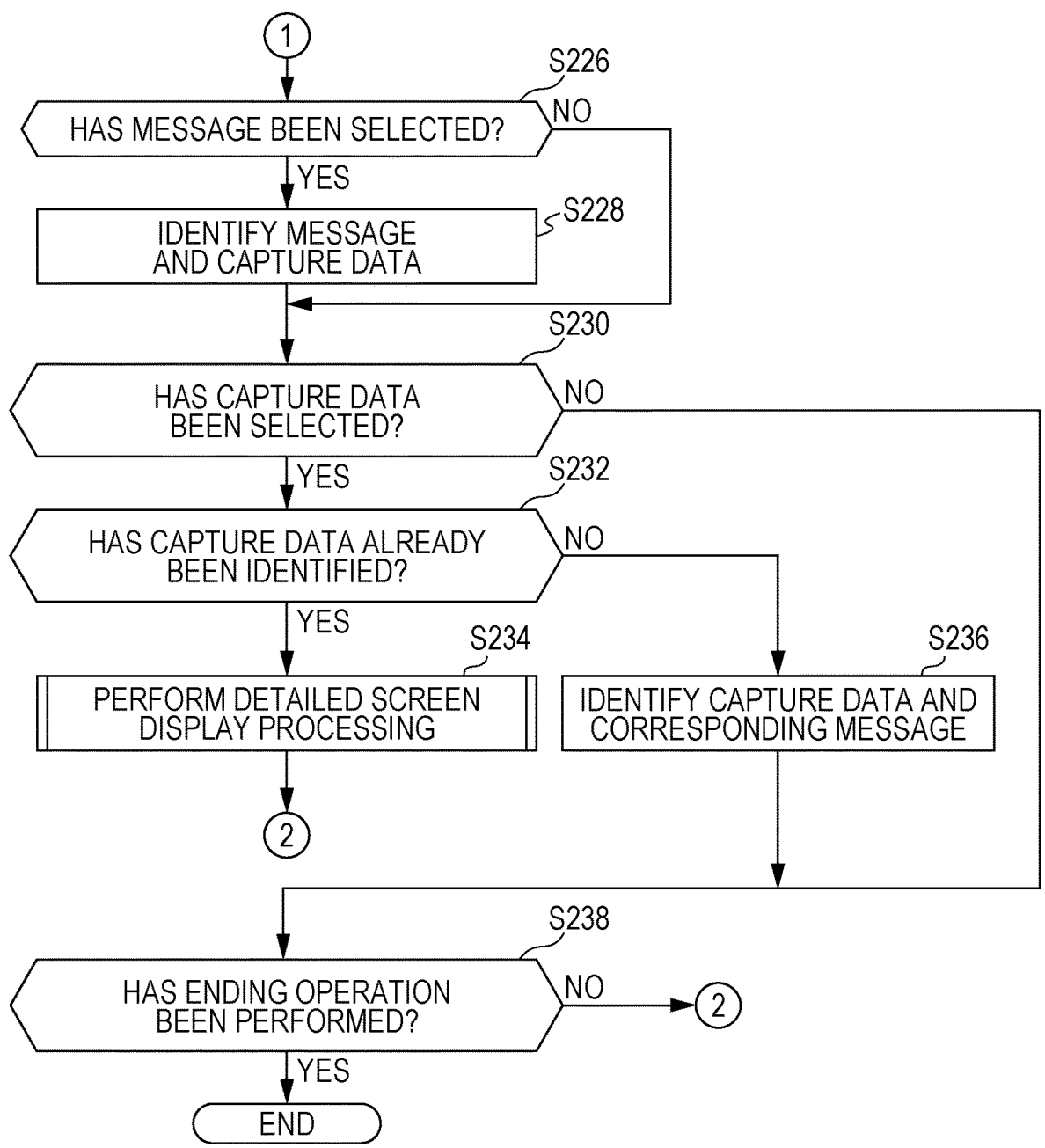
FIG. 9 illustrates an operation flow of summarized screen display processing according to the first embodiment.

With reference to FIG. 8 and FIG. 9, the summarized screen display processing is described. The summarized screen is a screen that is displayed for a user to browse meeting information and a summary of the meeting.

In this embodiment, a summarized screen is generated by extracting and displaying tagged messages and important capture data. In this process, the tagged messages can be classified by the tags and displayed.

First, the meeting information 172 of a browsing target meeting is read (step S202). Then, a meeting title and users are read from the basic information 174 included in the meeting information 172, a topic name in the meeting is read from the topic information 176, and image data of the users who attended the meeting is read from the member information 178 and displayed (step S204).

The capture information 182 of the meeting is read, the capture data is reduced to generate a thumbnail image, and the generated thumbnail is displayed (step S206). The thumbnail may be generated from capture data when the capture data is stored or when the meeting ends, and stored.

To display the summarized screen, summary display processing is performed (step S208). The summary display processing will be described below.

After the summary display processing, messages relating to the selected topic are read from the message information 180 (step S210). When a topic has not been selected, for example, when the processing in step S210 is performed first, it may be considered that the first topic in the meeting has been selected, and the subsequent processing may be performed, or the processing may be stopped until a topic is selected.

Then, whether there is an identified thumbnail in the capture data that is being displayed as the thumbnails is determined (step S212). If no identified thumbnail exists, the first capture data in the selected topic is identified, and the first message that was made after the capture date and time of the first capture data is selected (step S212; No→step S214).

Capture data may be identified by enlarging a thumbnail as compared with other thumbnails and displaying the enlarged thumbnail, by changing the color or the thickness of the frame line displayed around a thumbnail, or by combining these methods. A message may be identified by changing the background of the region displaying the message, by changing the color of the thickness of the frame line displayed around the region, or by combining these methods.

Then, whether the topic has been changed to another topic or not is determined (step S216). For example, to change a topic to another topic, for example, a list of selectable topic names may be displayed and a topic name displayed on the list may be selected. After the topic has been changed to another topic, the processing in step S210 is performed (step S216; Yes→step S210).

When the topic has been changed, the state may be changed to a state in which no capture data is selected. In the state in which no capture data is selected, the processing in step S214 is performed and thereby the first thumbnail in the selected topic and a message corresponding to the thumbnail are selected.

After the processing, whether a message filtering condition has been specified or not is determined (step S218). The message filtering conditions may include, for example, a condition for filtering tagged messages, a condition for filtering messages of a specified user, and a condition for filtering messages including a specified character string. On the screen, buttons or fields for filtering may be provided to enable a user to specify a message filtering condition.

If a message filtering condition has been specified, among the messages read in step S210, messages that satisfies the filtering condition are extracted (step S218; Yes→step S220). If no message filtering condition has been specified, all messages read in step S210 are extracted (step S218; No→step S222).

Then, the extracted messages are displayed (step S224). In this processing, the display pattern may be changed depending on the type of the messages. For example, a tagged message may be displayed by changing the background of the region displaying the message, by changing the color of the thickness of the frame line displayed around the region, or by combining these methods.

In this embodiment, the message information 180 relating to the selected topic is read and then the filtering is performed; however, as long as the filtering of messages can be performed and filtered messages can be displayed, any other method may be employed. For example, every time a topic is selected or a filtering condition is specified, messages that meet the condition may be extracted from the message information 180 and displayed.

Then, whether a message is selected from the messages displayed in step S224 is determined (step S226). If a message is selected, instead of the message that has been selected so far, the selected message is identified. Furthermore, capture data corresponding to the message is identified (step S226; Yes→step S228). The display position of the capture data may be changed (scrolled) such that the identified capture data is displayed next to the selected message.

Then, whether the capture data displayed in step S206 is selected or not is determined (step S230). If the capture data is selected, whether the selected capture data has already been identified or not is determined (step S230; Yes→step S232). If the capture data that has already been identified is selected, detail display processing is performed (step S232; Yes→step S234). The detail display processing will be described below.

If capture data that has not been identified is selected, the capture data that has been identified so far is returned to normal display, and the selected capture data is identified. Furthermore, the first message that was made after the capture date and time of the capture data is selected and identified (step S232; No→step S236).

Then, whether an ending operation has been performed is determined (step S238). The ending operation may be, for example, an operation to close the summarized screen. If an ending operation is performed, the summarized screen display processing is ended (step S238; Yes). In other cases, the processing in step S216 is performed (step S238; No→step S216 in FIG. 8).

1.3.4 Summary Display Processing

Figure 10:
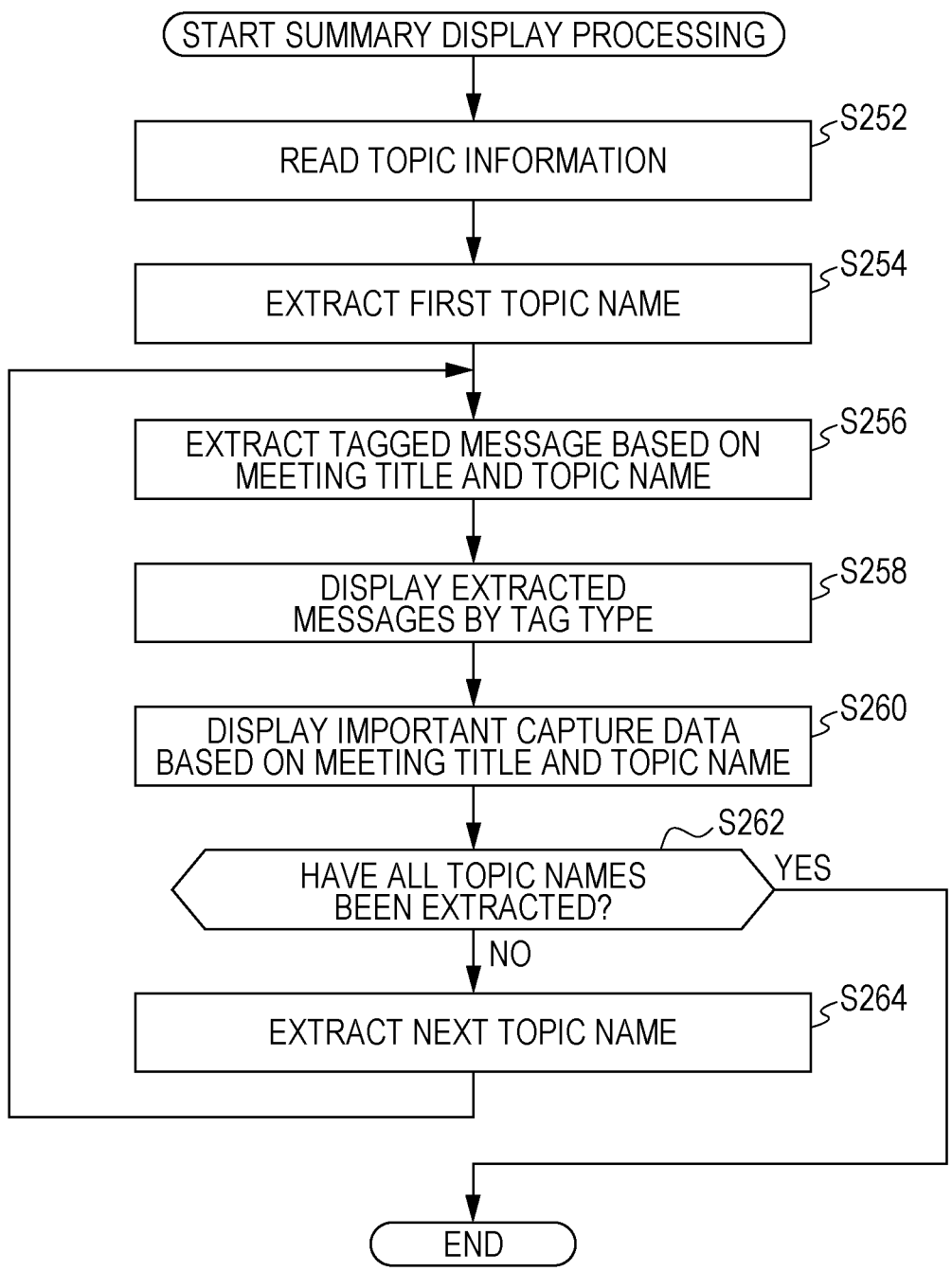
FIG. 10 illustrates an operation flow of summary display processing according to the first embodiment.

With reference to FIG. 10, the summary display processing is described. The summary display processing is to display a specific message (for example, an important message or a message a user wants to display) together with specified capture data (for example, important capture data or capture data a user wants to display).

First, based on a meeting title, the topic information 176 is read to extract topic names in the meeting (step S252). Then, from the extracted topic names, the first topic name is extracted (step S254), and by using the meeting title and the topic name, tagged messages are extracted from the messages stored in the message information 180 (step S256).

The extracted messages are classified by the types of the tags and displayed (step S258). For example, messages that have a tag "conclusion" are displayed and then messages that have a tag "task" are displayed. With this processing, only important messages can be checked without checking all messages. Whether to display messages or not may be determined by a tag, for example, messages having a tag "important" are not to be displayed. The tags to be displayed may be set by a user or may be preset in the display apparatus 10.

After the processing, based on the meeting title and the topic name, important capture data is displayed (step S260). Specifically, from the capture information 182, capture data that has the specifying flag "On" is extracted and displayed. With this processing, only important capture data can be checked without checking all capture data.

Then, whether all topic name have been extracted or not is determined (step S262). If all topic names have not been extracted, the next topic name is extracted and the processing returns to step S256 (step S262; No→step S264). Specifically, with respect to all topic names in the meeting, important messages and important capture data are displayed. If all topic names have been extracted, the summary display processing is ended (step S262; Yes).

1.3.5 Detail Display Processing

Figure 11:
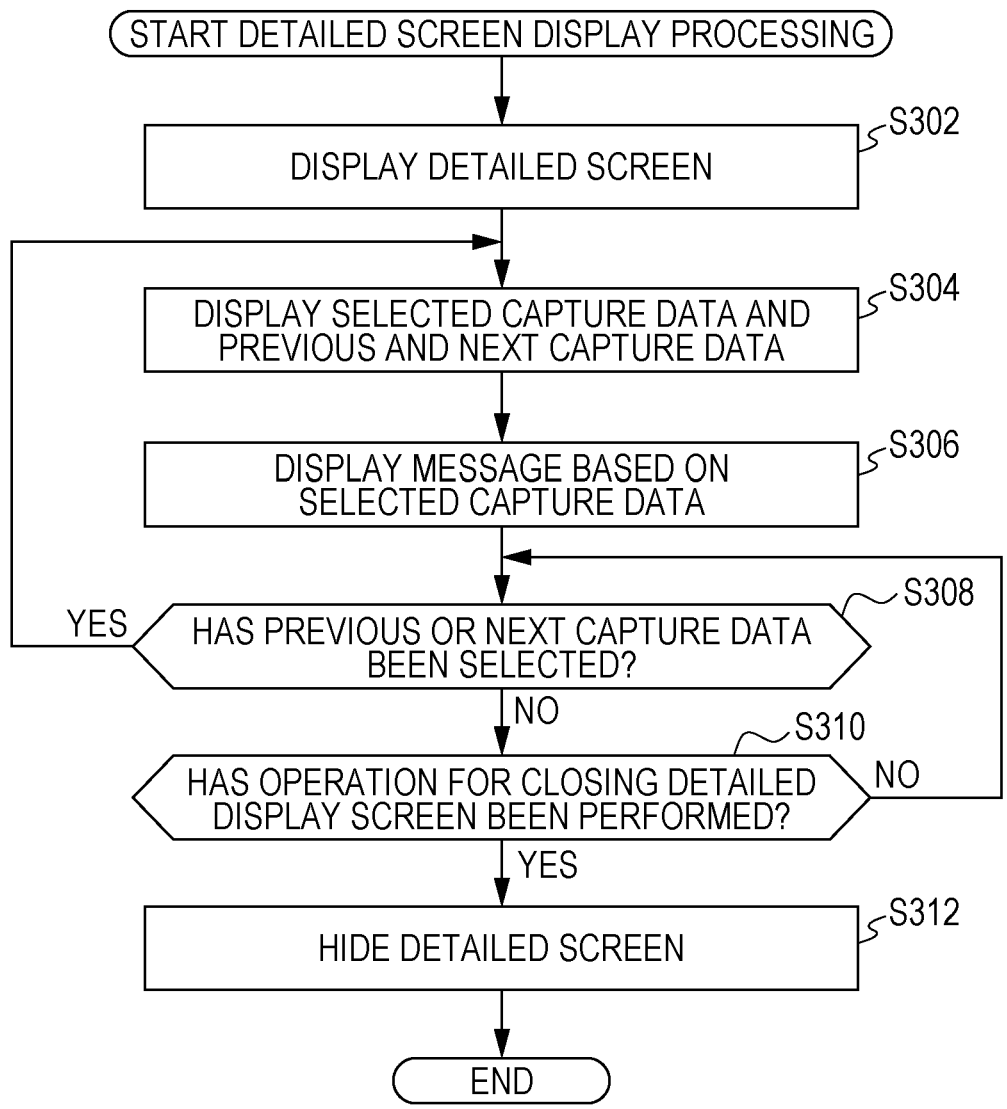
FIG. 11 illustrates an operation flow of detailed screen display processing according to the first embodiment.

With reference to FIG. 11, the detail display processing is described. A detailed display screen is a screen for checking capture data and messages relating to the capture data.

First, a detailed display screen is displayed (step S302). For example, a detailed display screen may be displayed in a dialog form so as to overlap a summarized screen.

Then, selected capture data and previous and next capture data are displayed (step S304). The selected capture data is the capture data selected in step S230 in FIG. 9 or capture data selected in step S308, which will be described below. The previous and next capture data of the selected capture data, that is, capture data located before and after the selected data when the capture data is arranged in chronological order is also read and displayed. With this processing, the temporal relationship of the capture data can be displayed.

Then, messages corresponding to the selected capture data are displayed (step S306). For example, messages stored between the capture date and time of the selected capture data and the date and time of the capture data that had been captured before the capture date and time are displayed. With this processing, messages and other information made before the storage of the selected capture data can be checked.

If the previous or next capture data of the selected capture data is selected, the processing returns to step S304, and the previous and next capture data and messages relating to the newly selected capture data are displayed (step S308; Yes→step S304). If the previous or next capture data of the selected capture data is not selected, whether an operation to close the detailed display screen has been performed or not is determined. If an operation to close the detailed display screen has been performed, the detailed display screen is hidden (step S310; Yes→step S312).

1.4 Example Operation

An example operation (example screens) according to the first embodiment will be described with reference to the drawings. First, meeting screens are described. A meeting screen is a screen that is displayed during the discussion in a meeting or the like. FIG. 12A illustrates a display screen W100, which is an example meeting screen.

As illustrated in FIG. 12A, on the display screen W100, a content display region R100, a timeline region R110, a topic list L120 for selecting a topic, and a summarizing button B120 for issuing an instruction for displaying a summarized screen are displayed.

In the content display region R100, a content C100 and a button B100 for performing an important content specifying operation are displayed. A user can perform a page feeding operation or an input operation by handwriting to the content C100. Furthermore, a user can use (for example, touch) the button B100 to specify the capture data of the content C, for example, specify that capture data is important.

In the timeline region R110, messages are displayed in chronological order. In this embodiment, for each message, a message region S110 that includes an image S112 for identifying a member, a message S114, and a tag image S116 that indicates a tag applied to the message is generated and added to the timeline region R110.

To add the message region S110 to the timeline region R110, the message region S110 may be added to the bottom or the top of the timeline region R110. If there is no space to add the message region S110 in the timeline region R110, message regions S110 that have already been displayed are scrolled and a message region S110 that is to be newly added is displayed at the top or the bottom of the timeline region R110.

As a method of applying an attribute to a message, an operation of applying a tag will be described with reference to FIG. 12B to FIG. 12D. First, a user touches and holds an image S116 that indicates a tag (FIG. 12B). Upon the touching and holding operation, a tag selection region S118 is displayed (FIG. 12C). When a tag displayed in the tag selection region S118 is selected, the message is tagged and identified (FIG. 12D). To change a tag that has already been applied, a tag to be newly applied can be selected by the above-described operation.

Alternatively, when a user selects the image S116 indicating the tag and cancels the selection before the tag selection region S118 is displayed, a tag that corresponds to the image S116 indicating the tag may be applied to the message. The tag to be applied in response to such an operation may be preset to the display apparatus 10 or set by a user.

When the message region S110 is not identified, as the image S116, an image indicating a tag that is applied without using the tag selection region S118 may be displayed. In this embodiment, when the message region S110 is not identified, an outline of the tag to be applied is displayed.

To cancel the application of the tag, the message is touched and held as illustrated in FIG. 12E. Upon the touching and holding operation, the application of tag is canceled and the message is not identified as illustrated in FIG. 12F.

The topic list L120 is expanded by selecting (for example, by touching) the list. The topic list L120 is a list of topic names in the meeting being held. By selecting a topic name from the topic names on the list, topics can be changed. When a topic is changed to another topic, messages relating to the topic are displayed in the timeline region R110.

Now, the summarized screen is described. The summarized screen is a screen that is displayed by executing the summarized screen display processing.

Figure 13:
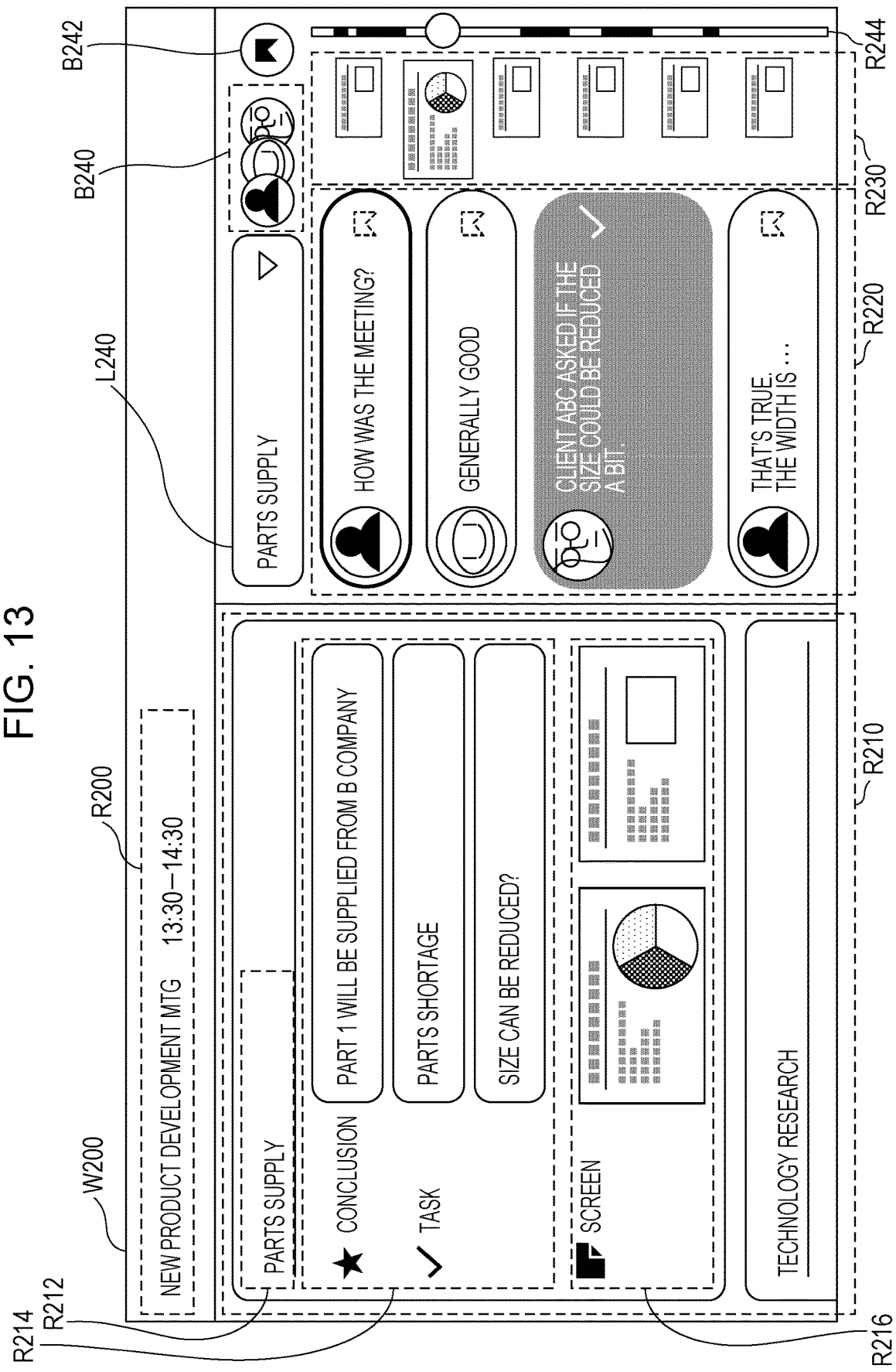
FIG. 13 illustrates an operation (summarized screen) according to the first embodiment.

FIG. 13 illustrates a display screen W200, which is an example summarized screen. The display screen W200 includes a region R200, a summary region R210, a timeline region R220, a thumbnail region R230, a topic list L240, buttons B240 and B242, and a scroll bar B244. The region R200 displays basic information of a meeting such as a meeting title and date and time. The topic list L240 is used to select a topic. The buttons B240 and B242 are used to filter messages. In other words, the display screen W200 includes the timeline region R220 (thumbnail region 230) as a first display region and the summary region R210 as a second display region.

In the summary region R210, a summary is displayed for each topic. The display of summary includes a region R212 for displaying a topic name, a region R214 for displaying tagged messages by the tag types, and a region R216 for displaying important capture data. If it is not possible to display the entire summary in the summary region R210, the summary region R210 is scrolled to display a part of the summary that has not been displayed.

In the timeline region 220, messages relating to the topic selected from the topic list L240 are displayed in chronological order. In the thumbnail region R230, capture data relating to the meeting is displayed as thumbnails in chronological order.

The capture data displayed in the thumbnail region R230 can be changed by operating the scroll bar B244. In this operation, the indicated capture data is changed depending on the position of the thumb on the scroll bar B244. When capture data relating to a topic that is different from the topic that has been selected so far is identified, the corresponding topic may be displayed in the topic list L240 or the summary region 210 may be scrolled such that the corresponding topic can be displayed in the summary region R210.

Furthermore, positions of tagged messages may be displayed in the margin inside the scroll bar B244. With this display, a user can operate the thumb with reference to the display on the scroll bar B244 to display tagged messages.

Figure 14A:
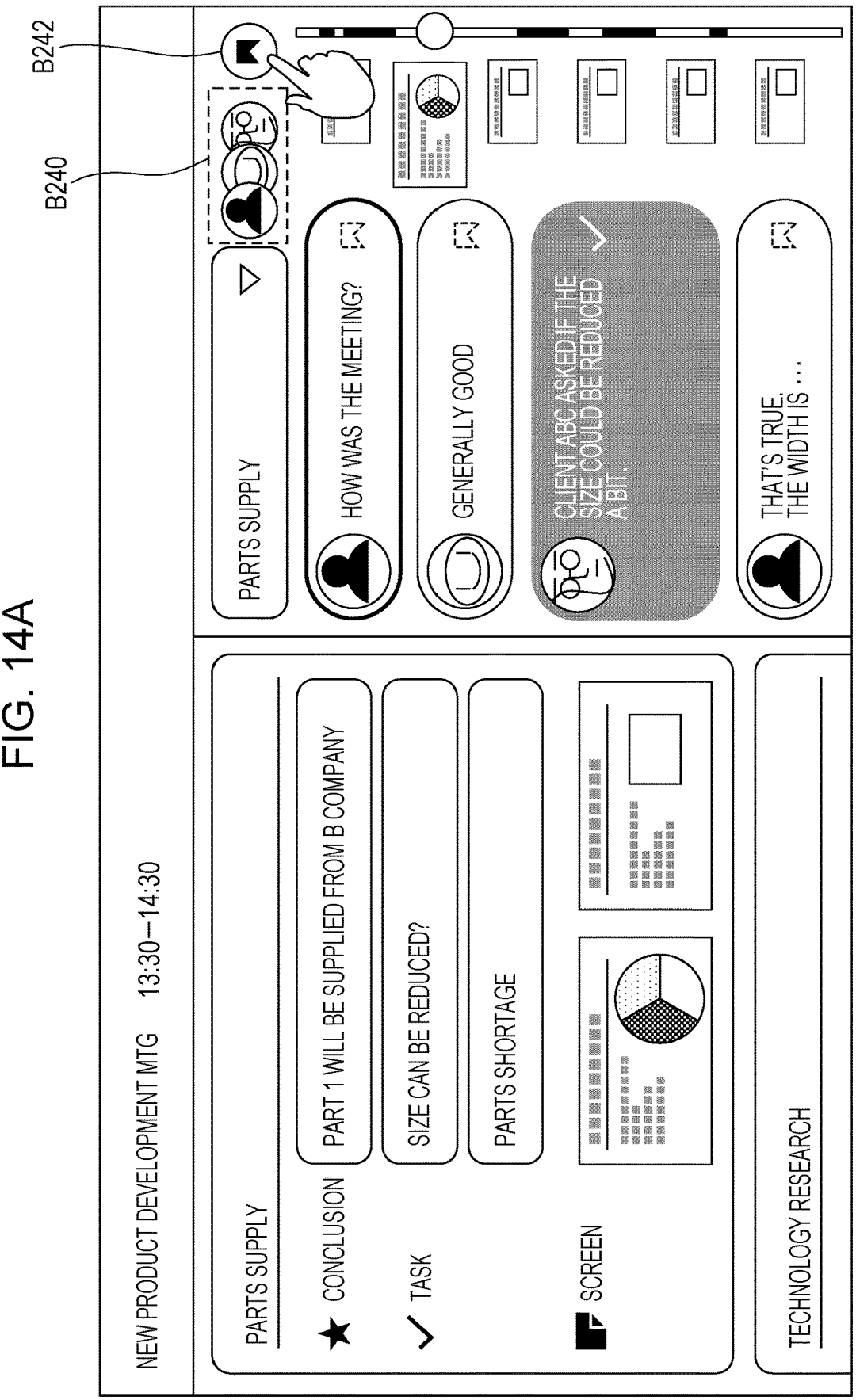
FIG. 14A and FIG. 14B illustrate an operation (summarized screens) according to the first embodiment.

Now, the filtering of messages will be described with reference to FIG. 14A and FIG. 14B. FIG. 14A illustrates an example operation while the button B242 for filtering messages is being selected. The button B242 is used to instruct to display only tagged messages.

Figure 14B:
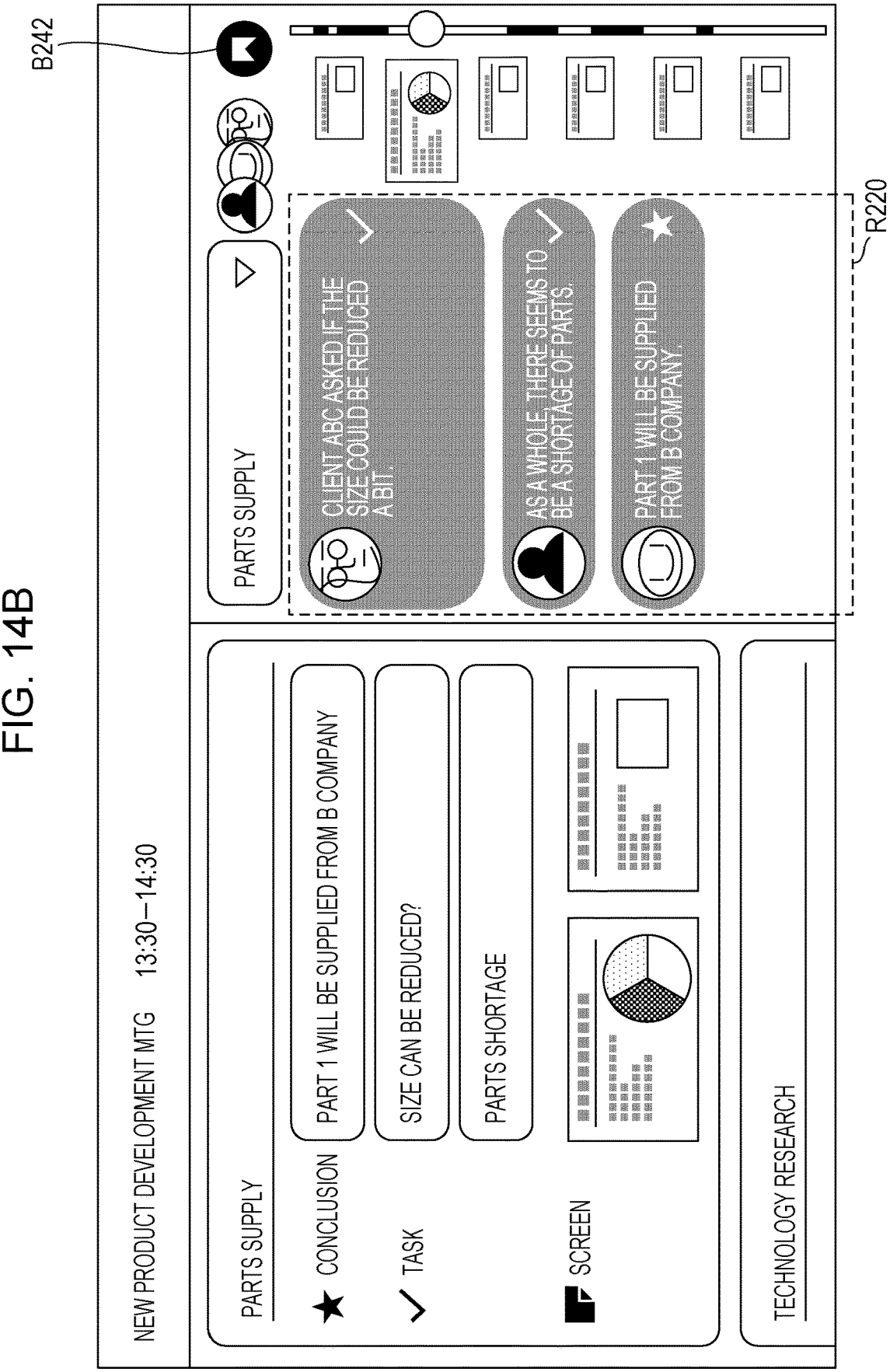

FIG. 14B illustrates an example operation after the button B242 has been selected. The display of the button B242 is changed to indicate that the button B242 is being selected. In response to the selection of the button B242, tagged messages are filtered and displayed in the timeline region R220. In the thumbnail region R230, only the capture data that corresponds to the tagged messages is displayed.

When the button B242 is selected again, the selection of the button B242 is canceled. Simultaneously, the instruction for displaying only the tagged messages and the corresponding capture data is canceled. Accordingly, in the timeline region R220, all messages are displayed and in the thumbnail region R230, all capture data is displayed.

The button B240 is used to instruct to filter messages by a speaker and display the messages, and an image of a user is displayed. The operation of selection is similar to that of the button B242, and only messages corresponding to the selected user are displayed in the timeline region R220.

Only one of the button B240 and the button B242 may be selected at one time or a plurality of buttons may be simultaneously selected. When a plurality of buttons are selected, filtering conditions are combined to filter messages. Other than the above-described buttons, a text field for filtering messages that include a specified character string and displaying the messages may be displayed.

Figure 15A:
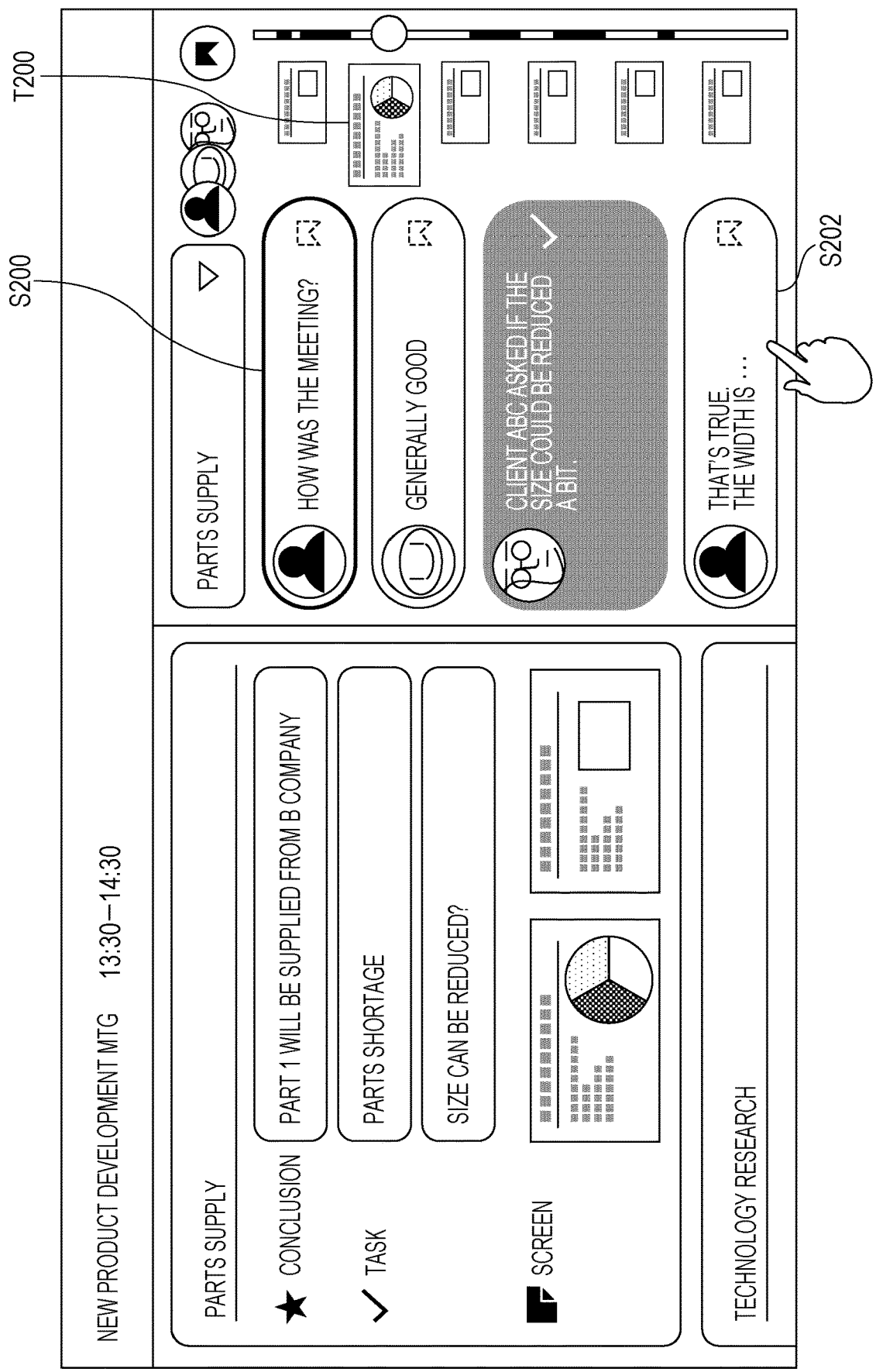
FIG. 15A and FIG. 15B illustrate an operation (summarized screens) according to the first embodiment.
Figure 15B:
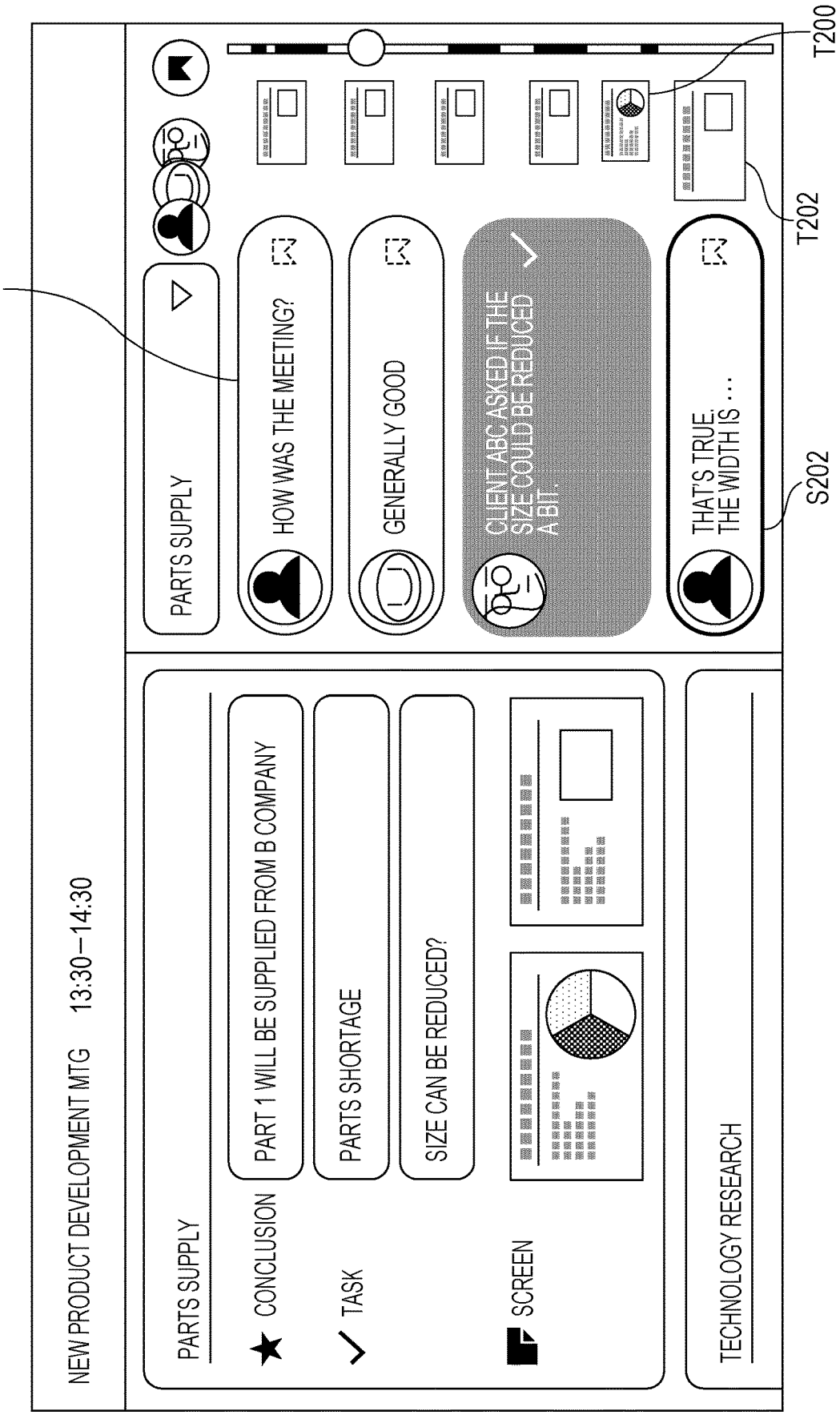

Now, the operation performed when a message is selected will be described with reference to FIG. 15A and FIG. 15B. FIG. 15A illustrates a state in which a message region S202 displayed in the timeline region 240 is being selected. FIG. 15B illustrates a state after the message region S202 has been selected.

When the message is selected, the message region S202 is identified and the identification of the message region S200 that has been identified so far is canceled. Then, capture data T202 that corresponds to the message in the message region S202 is identified and scrolled so as to be located next to the message region S202. During the operation, the identification of the capture data T200 that has been identified so far is canceled.

In other words, when a message is selected, corresponding capture data is identified and moved next to the selected message. With this operation, the user can readily check the content that was displayed at the time the message was made.

Figure 16A:
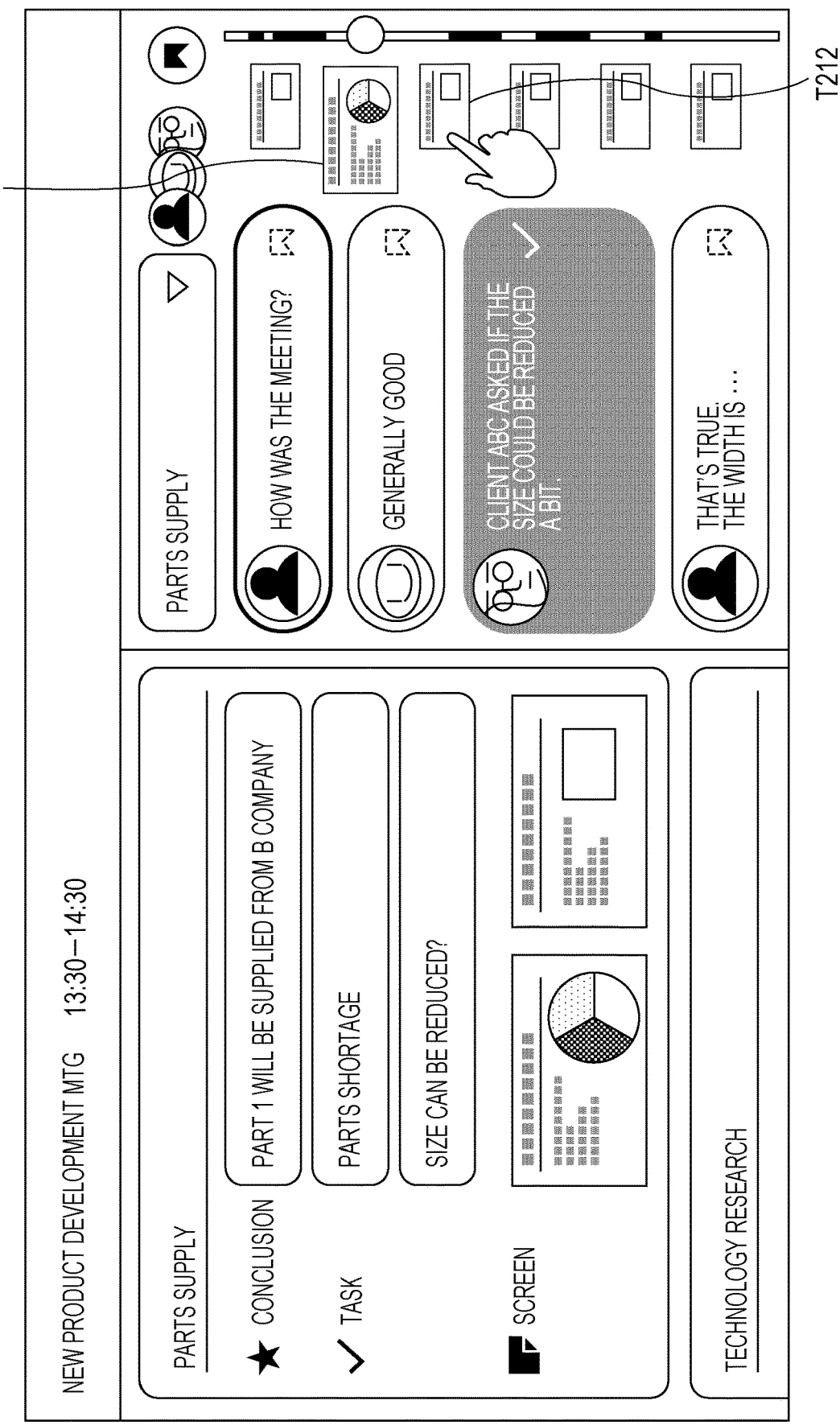
FIG. 16A and FIG. 16B illustrate an operation (summarized screens) according to the first embodiment.
Figure 16B:
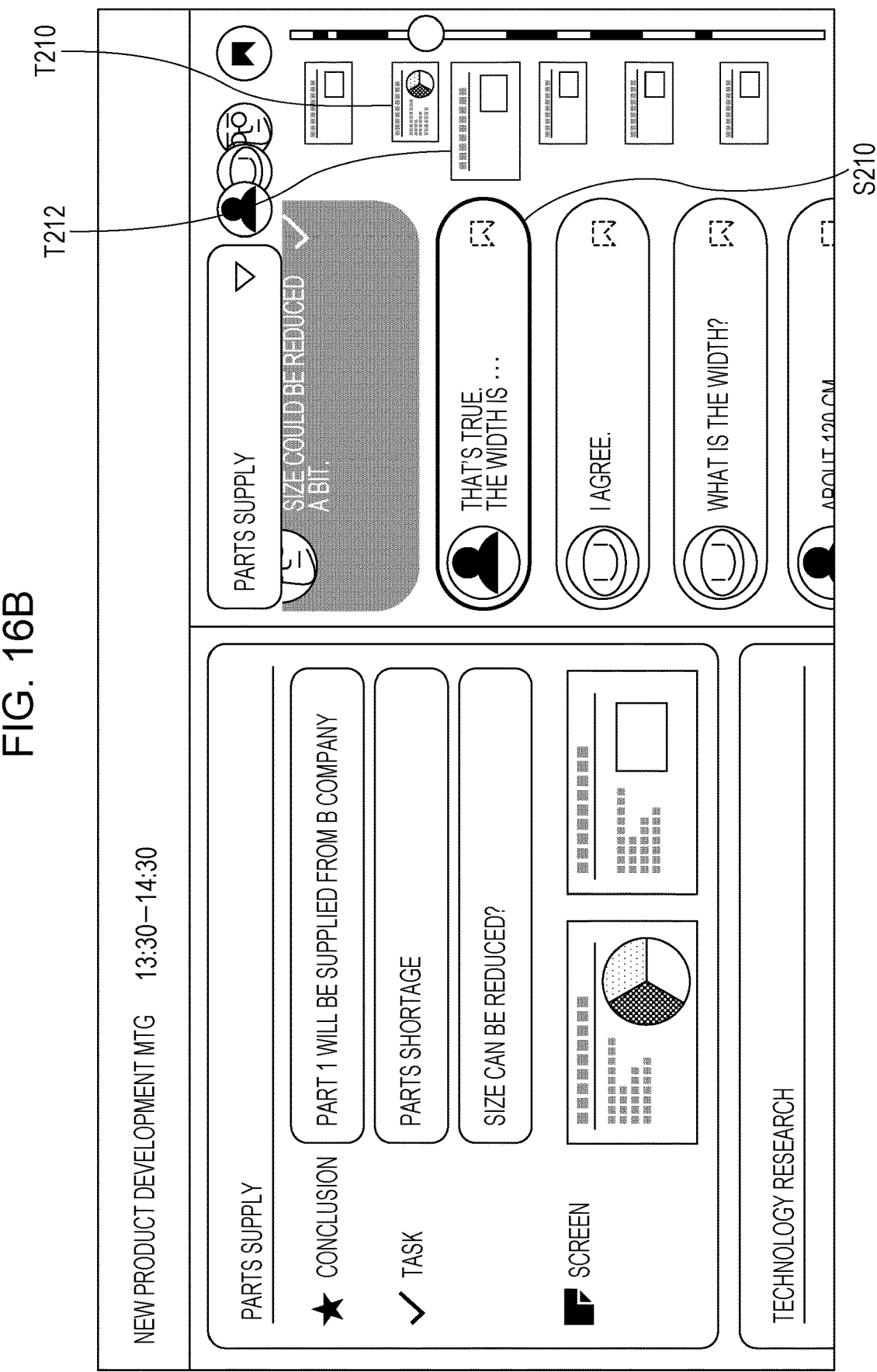

The operation performed when capture data that is not identified is selected will be described with reference to FIG. 16A and FIG. 16B. FIG. 16A illustrates a state in which capture data T212 that is not identified is being selected. FIG. 16B illustrates a state after the capture data T212 has been selected.

When the capture data T212 is selected, instead of the capture data T210 that has been identified so far, the capture data T212 is identified. A message S210 that corresponds to the selected capture data is scrolled so as to be located next to the capture data T212 and the message S210 is identified. With this operation, the message that corresponds to the content can be readily checked.

Figure 17A:
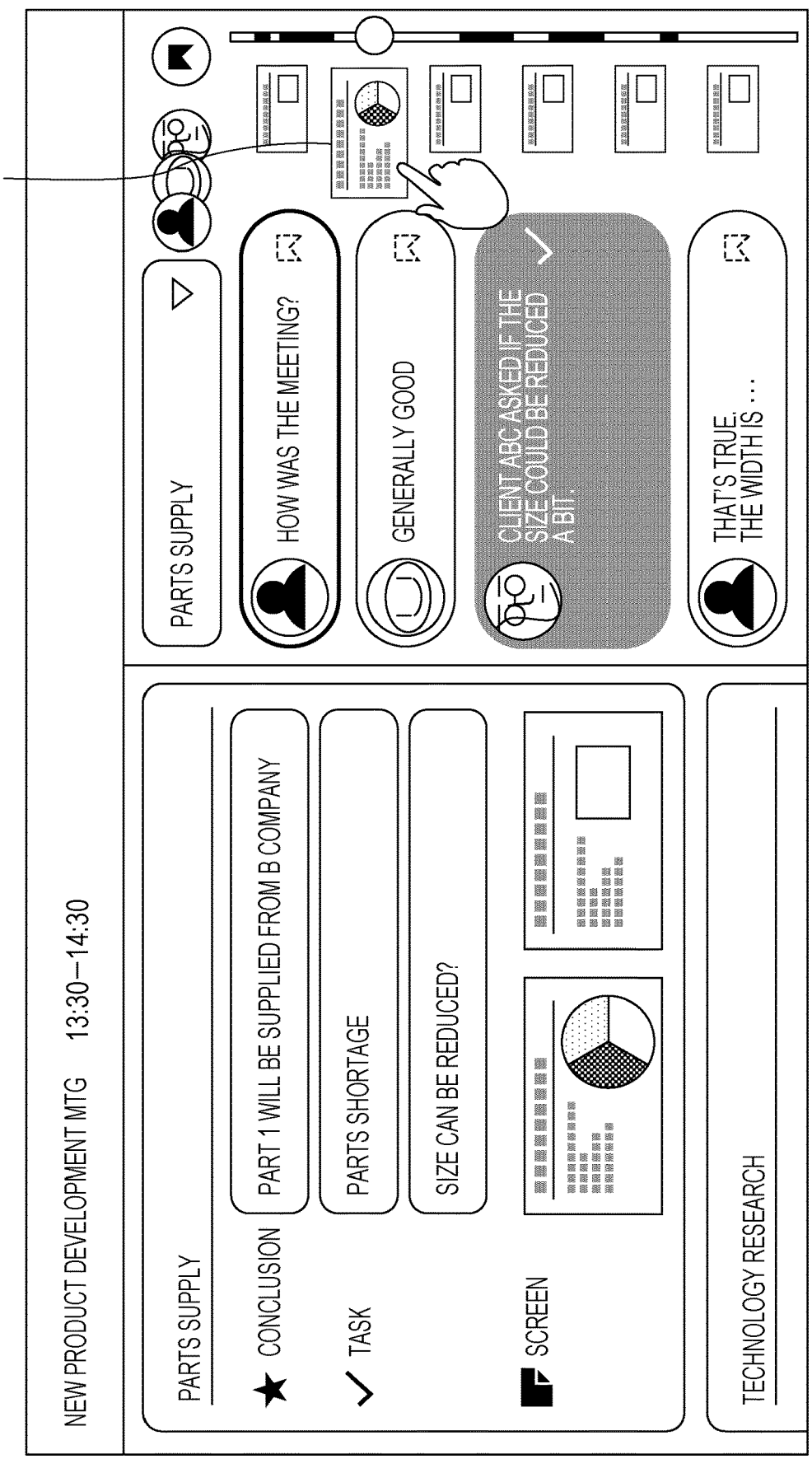

The operation performed when capture data that is identified is selected will be described with reference to FIG. 17A and FIG. 17B. FIG. 17A illustrates a state in which capture data T220 that is identified is being selected. FIG. 17B illustrates a state after the capture data T220 has been selected.

When the identified capture data is selected, the detail display processing is performed and a display screen W300 that is a detailed screen is displayed so as to overlap a summarized screen. In the display screen W300, selected capture data R300 and the previous capture data R302 and the next capture data R304 are displayed. Then, messages corresponding to the selected capture data R300 are displayed in a region R306.

When the previous capture data R302 or the next capture data R304 is selected, the detail display processing is performed again, and the display screen W300 is updated. When a button B300 for closing the detail screen is selected, the detail screen is hidden.

2. Second Embodiment

A second embodiment will be described. The second embodiment stores voice as recorded data and replays the recorded data on a summarized screen. The functional configurations and processing flows in this embodiment are similar to those in the first embodiment, and accordingly, different points will be mainly described.

In this embodiment, voice data is added to the message information 180. In step S154, an input voice is stored in the voice recognition section 150. In other words, a message is associated with voice data.

On a summarized screen or a detail screen, in a region messages are displayed, a button for replaying voice data is displayed. A user selects the button to replay the voice data.

Figure 18A:
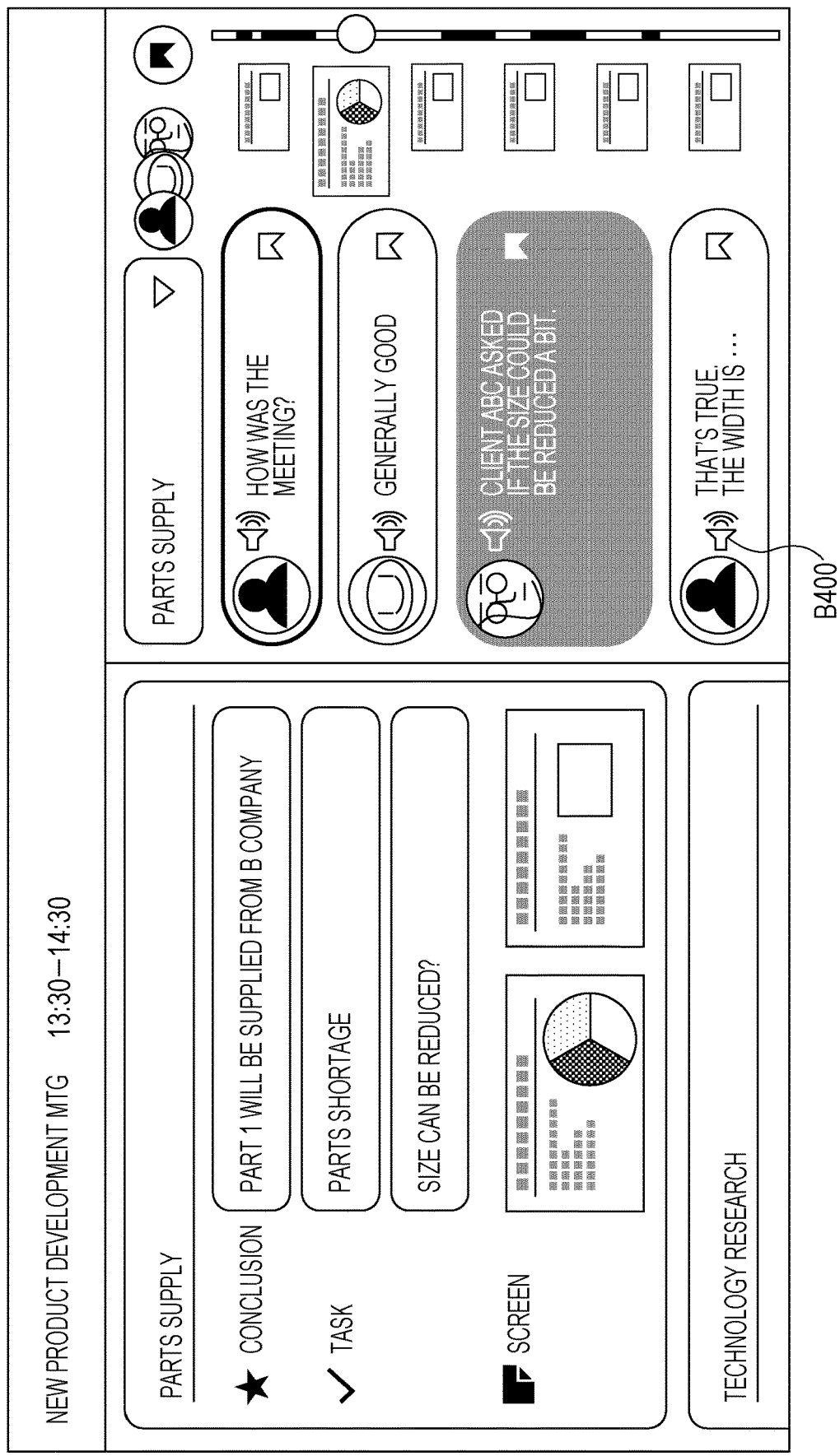

With reference to FIG. 18A and FIG. 18B, an example operation is described. FIG. 18A illustrates an example operation in a summarized screen, and a button B400 for replaying voice data is displayed in the message region. FIG. 18B illustrates an example operation in a detail screen, and buttons B402 for replaying voice data are displayed in the region messages are displayed.

In the above-described embodiment, one piece of voice data is associated with one message; however, recorded data of a meeting or recorded data of a topic may be used. In such a case, the replaying of the voice data of each message can be performed by storing the start date and time and the end date and time (or the length) of the speech and the start time of the topic and controlling a replay start point and a replay stop point of the voice data.

As described above, in this embodiment, a message and also voice data can be checked. Consequently, information that is hard to read only by a message can be understood, for example, the atmosphere at the time a message was made can be understood. Accordingly, the content of a meeting can be more deeply understood.

3. Third Embodiment

A third embodiment will be described. In the third embodiment, no voice input and no voice recognition are made. The functional configurations and processing flows in this embodiment are similar to those in the first embodiment, and accordingly, different points will be mainly described.

The display apparatus 10 receives a message (for example, text data) input by a user. The reception of the message may be performed via the communication section 160 or by an input device that is connected to the display apparatus 10.

In the meeting storage processing in FIG. 7, if a message is input, the processing from step S152 to step S156 is replaced with the operation of storing the input message in the message information 180.

As described above, in this embodiment, a summary can be generated based on a message input by a user. Accordingly, this embodiment is effective under environments voice recognition is not used, for example, a meeting by text chat.

4. Fourth Embodiment

A fourth embodiment will be described. In the fourth embodiment, in the meeting storage processing, messages are automatically tagged. The functional configurations in this embodiment are similar to those in the first embodiment, and accordingly, different points will be mainly described.

In this embodiment, in step S154 in the meeting storage processing, messages are tagged based on the text data output from the voice recognition section 150 or the operation performed to the display apparatus 10 at the time the message was made, and the tagged messages are stored.

To tag messages, for example, whether a tag recognition word or phrase is contained in a message is determined. The tag recognition words and phrases may be stored in the storage section 170 in advance or may be input by a user. The tag recognition words and phrases are stored for individual attributes to be applied. For example, a tag "task" has stored tag recognition words and phrases such as "deadline", "due date", and "things to do".

If a message includes the above-mentioned tag recognition ward or phrases, the corresponding attribute information (tag) is automatically applied to the message. The tag recognition word or phrase may be one or a plurality of tag recognition words and phrases may be stored. Alternatively, individual messages may be weighted and their tags may be determined or the tags may be applied by machine learning.

The operations that may be made to the display apparatus 10 include an operation of enlarging the display of a material, an operation of drawing on a material, an operation of specifying a display content on the display apparatus 10 to be important while a message is being made, and the like, and when such an operation is performed, an appropriate tag may be applied to the message.

The tagging may be performed by methods other than the above-described method. For example, based on information about job titles stored in the member information 178, criteria for determining whether a message is important or not may be adjusted.

Similarly, a specifying flag may be automatically applied to capture data. For example, the importance of a content may be calculated based on the number of times of drawing operations to the content, display time, the size of a message on the display, and the like, and when the importance exceeds a predetermined threshold, a specifying flag may be set to "On".

As described above, according to the embodiment, even if no tagging operations is performed, the display apparatus 10 automatically tags messages. Consequently, chances of missing applying a tag due to user's attention to the meeting or obstacles on the progress of the meeting due to tagging operations can be reduced and the convenience can be increased.

According to the above-described embodiment, users of the meeting system can readily check speeches (messages) that have been made so far by checking the summarized screen. Especially, when users of the meeting system include users who attended the meeting (attendees) and users who could not attend the meeting, the users who could not attend the meeting can check a summarized screen to readily check the flow of the meeting. Also the attendees can readily look back on the flow of the meeting later.

5. Modifications

While the embodiments have been described with reference to the attached drawings, it is to be understood that the specific configurations are not limited to these configurations according to the embodiments, design choices that are not departing from the scope of the disclosure are included within the scope of the claims.

In the above-described embodiments, a content of a message made by a speaker is recognized by voice recognition and displayed; however, methods other than the voice recognition may be employed. For example, a message may be input by text input and contents according to the above-described embodiments may be made based on the message.

In the above-described embodiments, messages are displayed in a single language (for example, Japanese); however, each message may be translated and displayed. For example, tagged messages may be translated into other languages, for example, English, German, Chinese, or the like, and displayed. With this processing, for example, on meeting screens and summarized screens, the display may be made by desired languages.

In the above-described embodiments, the programs running on the devices are programs (programs for causing a computer to operate) for controlling a CPU or the like so as to implement the functions in the above-described embodiments. The information used in the apparatus is temporarily stored in a temporary storage (for example, a random access memory (RAM)) during the processing, stored into a storage device such as a read-only memory (ROM), HDD, or a solid-state drive (SSD), and read, modified, or written by the CPU as necessary.

To distribute the programs to the market, the programs may be stored on portable recording media and distributed or may be transferred to server computers connected via a network such as the Internet. In this case, the memory devices of server computers are included in this disclosure.

The present disclosure contains subject matter related to that disclosed in Japanese Priority Patent Application JP 2017-177792 filed in the Japan Patent Office on Sep. 15, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
    a controller;
    a first display screen;
    a memory storing a program to control the display control apparatus attached to the controller;
    wherein the memory:
    stores a plurality of input messages and identifying information used to identify a user entering the plurality of messages;
    wherein the controller:
    generates a second display screen having
        a third display region for displaying the plurality of input messages and the identifying information in chronological order and
        a fourth display region for displaying a content, and displays the second display screen, applies a selected tags from a plurality of types of the tags as an attribute information to the plurality of messages displayed in the second display screen; and
    switches the second display screen to the first display screen in a case when an instruction on a first display instruction button displayed on the second display screen is accepted,
    wherein the first display screen comprises
        a first display region for displaying the plurality of messages, the identifying information and a plurality of thumbnails of a capture data of the content displayed in the fourth region of the second display screen in chronological order and a second display region for displaying a message and the specific capture data, the message being extracted from the plurality of messages based on the attribute information, and the controller displays the message extracted from the plurality of messages according to types of the attribute information on the second display region, and filters and displays the tagged message on the first display region and displays the capture data corresponds to the filtered message on the first display region in a case when an operation to filter tagged message is performed.

2. The display control apparatus according to claim 1, wherein the controller further applies at least one of the plurality of types of the tags as the attribute information to a message selected from the plurality of messages displayed in the second display screen.

3. The display control apparatus according to claim 1, wherein the controller further generates the capture data of the content when the content displayed in the fourth display region satisfies a predetermined condition, and displays the capture data of the content together with the messages in the first display region in the first display screen.

4. The display control apparatus according to claim 3, wherein when the content displayed in the fourth display region is selected, the controller applies a specifying flag to the capture data of the content at the time of selection, and the specific capture data to which the specifying flag has been applied is displayed together with the extracted message in the second display region.

5. The display control apparatus according to claim 1, wherein the controller further inputs a voice signal; and recognizes the voice signal input in the voice input section and output a message; and wherein the memory stores the message output from the controller.

6. The display control apparatus according to claim 1, wherein the memory stores a recognition word or phrase that corresponds to each of the plurality of types of tags, wherein the controller applies corresponding tag as the attribute information when the messages include the recognition word or phrase.

7. The display control apparatus according to claim 1, wherein when the message displaying in the first display region is selected, the controller displays the thumbnail of the capture data corresponding to the selected message so as to be located next to the selected message.

8. The display control apparatus according to claim 1, wherein when the thumbnail of the capture data displaying in the first display region is selected, the controller displays the message being displayed in the first display region corresponding to the selected thumbnail so as to be located next to the selected thumbnail.

9. A display control method comprising:

generating a first display screen;

storing a plurality of input messages and identifying information used to identify a user entering the plurality of messages;

generating a second display screen having a third display region for displaying the plurality of messages and identifying information in chronological order and a fourth display region for displaying a content, and displays the second display screen, applying a selected tags from a plurality of types of the tags as an attribute information to a message selected from the plurality of messages displayed on the second display screen; and switching the second display screen to the first display screen in a case when an instruction on a first display instruction button displayed on the second display screen is accepted, wherein the first display screen comprises a first display region for displaying the plurality of messages, the identifying information and a plurality of thumbnails of a capture data of the content displayed in the fourth region of the second display screen in chronological order and a second display region for displaying a message and the specific capture data, the message being extracted from the plurality of messages based on the attribute information wherein the message extracted from the plurality of messages according to types of the attribute information on the second display region is displayed, and the tagged message is filtered and displayed on the first display region and the capture data corresponds to the filtered message is displayed on the first display region in a case when an operation to filter tagged message is performed.

10. Non-transitory recording medium storing a program for causing a computer to execute:

generating a first display screen;

storing a plurality of input messages and identifying information used to identify a user entering the plurality of messages;

generating a second display screen having a third display region for displaying the plurality of messages and identifying information in chronological order and a fourth display region for displaying a content, and displays the second display screen, applying a selected tags from a plurality of types of the tags as an attribute information to a message selected from the plurality of messages displayed on the second display screen; and switching the second display screen to the first display screen in a case when an instruction on a first display instruction button displayed on the second display screen is accepted, wherein the first display screen comprises a first display region for displaying the plurality of messages, the identifying information and a plurality of thumbnails of a capture data of the content displayed in the fourth region of the second display screen in chronological order and a second display region for displaying a message and the specific capture data, the message being extracted from the plurality of messages based on the attribute information, wherein the message extracted from the plurality of messages according to types of the attribute information on the second display region is displayed, and the tagged message is filtered and displayed on the first display region and the capture data corresponds to the filtered message is displayed on the first display region in a case when an operation to filter tagged message is performed.

\* \* \* \* \*